United States Patent
Okada et al.

(10) Patent No.: US 10,863,372 B2
(45) Date of Patent: Dec. 8, 2020

(54) PACKET ANALYSIS PROGRAM, PACKET ANALYZING APPARATUS, AND PACKET ANALYSIS METHOD FOR ESTIMATING WIRELESS QUALITY ACCORDING TO A PACKET ANALYSIS

(71) Applicant: FUJITSU LIMITED, Kawasaki (JP)

(72) Inventors: Sumiyo Okada, Kawasaki (JP); Yuji Nomura, Kawasaki (JP); Fumiyuki Iizuka, Kawasaki (JP); Hirokazu Iwakura, Adachi (JP); Tatsuya Morita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 16/170,093

(22) Filed: Oct. 25, 2018

(65) Prior Publication Data
US 2019/0132756 A1  May 2, 2019

(30) Foreign Application Priority Data
Nov. 2, 2017  (JP) .................. 2017-212607

(51) Int. Cl.
| | | |
|---|---|---|
| *H04L 1/18* | (2006.01) | |
| *H04W 24/08* | (2009.01) | |
| *H04L 29/06* | (2006.01) | |
| *H04L 12/26* | (2006.01) | |
| *H04L 5/00* | (2006.01) | |
| *H04L 29/08* | (2006.01) | |
| *H04W 84/12* | (2009.01) | |
| *H04L 12/841* | (2013.01) | |

(52) U.S. Cl.
CPC .......... *H04W 24/08* (2013.01); *H04L 1/1861* (2013.01); *H04L 5/0055* (2013.01); *H04L 43/00* (2013.01); *H04L 67/2833* (2013.01); *H04L 69/22* (2013.01); *H04L 47/283* (2013.01); *H04W 84/12* (2013.01)

(58) Field of Classification Search
CPC ..... H04L 47/28; H04L 47/283; H04L 1/1861; H04L 5/0055; H04L 67/2833; H04W 84/025
See application file for complete search history.

(56) References Cited

U.S. PATENT DOCUMENTS

| | | | | |
|---|---|---|---|---|
| 2007/0277074 | A1* | 11/2007 | Yeo ................. | H04L 1/1621 714/749 |
| 2017/0324628 | A1* | 11/2017 | Dhanabalan ........ | H04L 43/0852 |
| 2017/0346874 | A1* | 11/2017 | Schmidt ............. | H04N 21/2343 |

FOREIGN PATENT DOCUMENTS

JP  2016-072824  5/2016

\* cited by examiner

*Primary Examiner* — Salvador E Rivas
(74) *Attorney, Agent, or Firm* — Fujitsu Patent Center

(57) ABSTRACT

A non-transitory computer-readable storage medium storing therein a packet analysis program for causing a computer to execute a process comprising detecting, from a plurality of received ACK packets, a successive ACK packet group including a plurality of ACK packets for which each reception interval is smaller than a first reference value and in which a round-trip time of each ACK packet becomes shorter in order of reception, and estimating wireless quality based on the number of ACK packets constituting the successive ACK packet group.

10 Claims, 18 Drawing Sheets

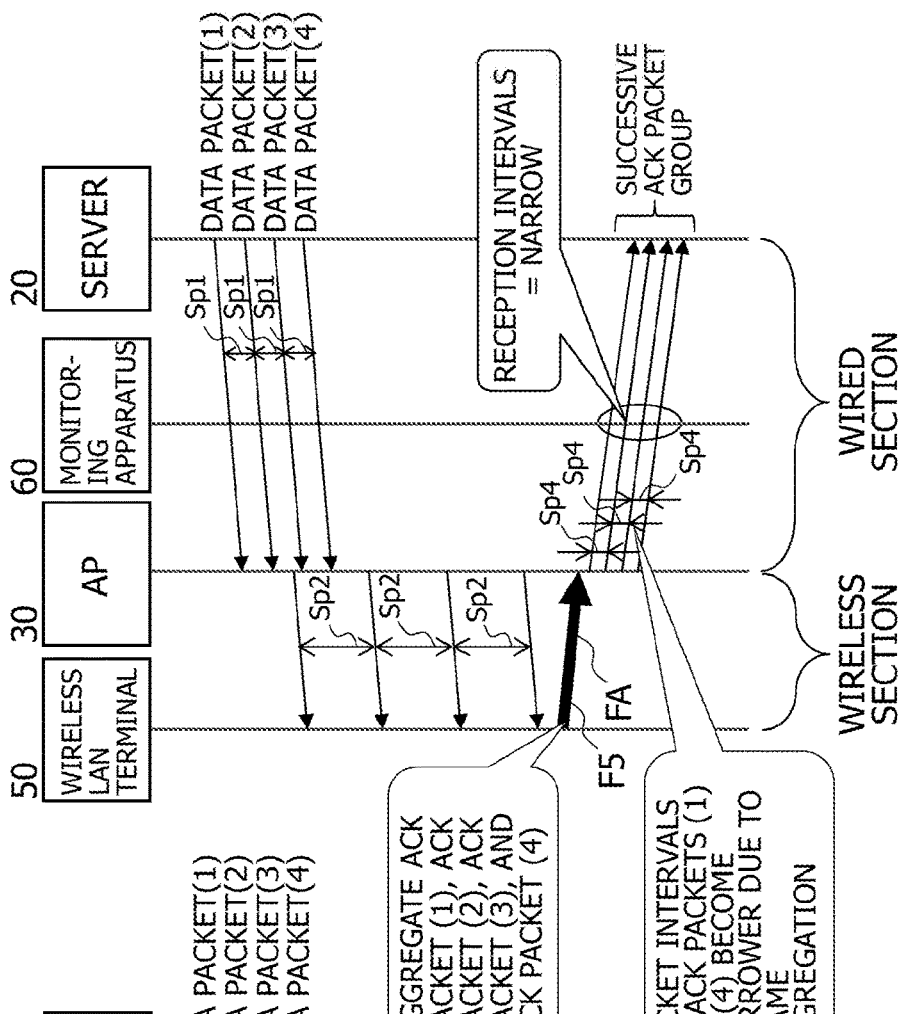
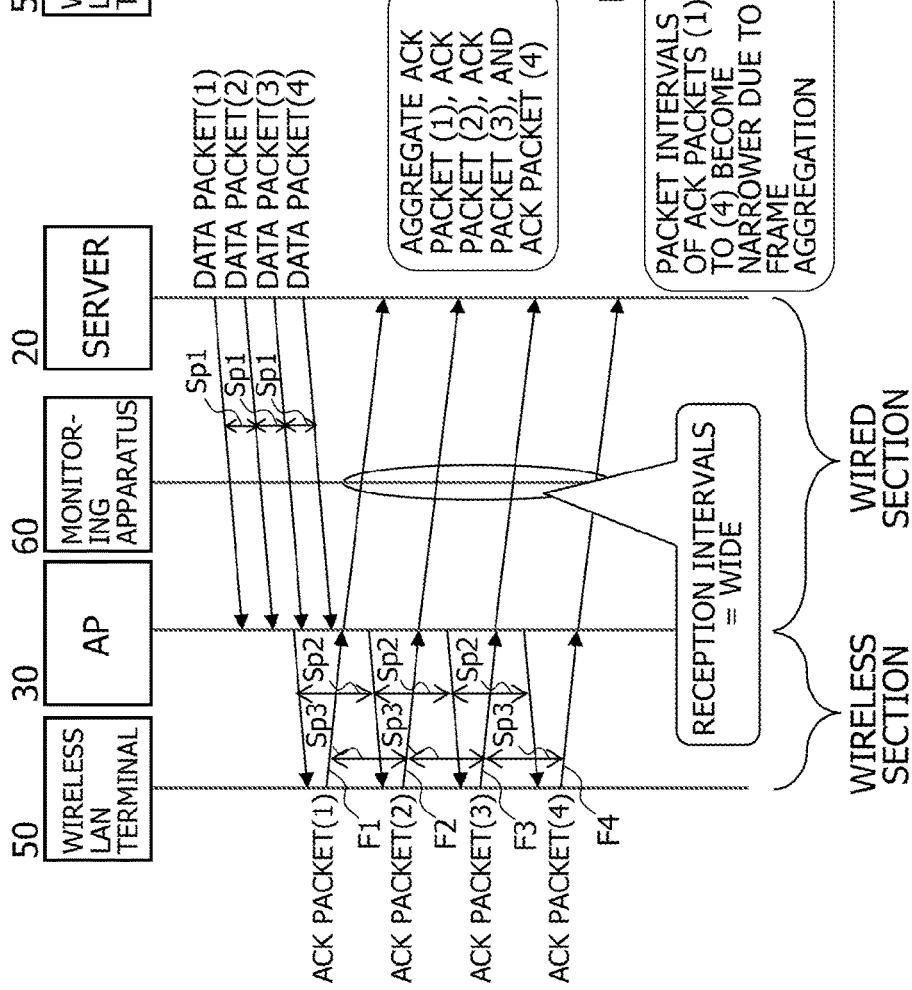
FIG.2A / FIG.2B

FIG.7    BASIC INFORMATION TABLE T1

| No | TIME | SrcIP | Sport | DestIP | Dport | TCP LEN | SEQ | NextSEQ | ACK | RTT |
|---|---|---|---|---|---|---|---|---|---|---|
| 6596 | 2017-03-07 10:57:50.280734 | 192.168.11.2 | 49169 | 192.168.11.3 | 5001 | 1460 | 1102030019 | 1102031479 | 2452581237 | |
| 6596.5 | 2017-03-07 10:57:50.280739 | 192.168.11.4 | 50000 | 192.168.11.3 | 6000 | 1000 | 10000 | 11000 | 3000000 | |
| 6597 | 2017-03-07 10:57:50.280744 | 192.168.11.2 | 49169 | 192.168.11.3 | 5001 | 1460 | 1102031479 | 1102032939 | 2452581237 | |
| 6598 | 2017-03-07 10:57:50.280751 | 192.168.11.2 | 49169 | 192.168.11.3 | 5001 | 1460 | 1102032939 | 1102034399 | 2452581237 | |
| 6599 | 2017-03-07 10:57:50.280760 | 192.168.11.2 | 49169 | 192.168.11.3 | 5001 | 1460 | 1102034399 | 1102035859 | 2452581237 | |
| 6600 | 2017-03-07 10:57:50.280765 | 192.168.11.2 | 49169 | 192.168.11.3 | 5001 | 1460 | 1102035859 | 1102037319 | 2452581237 | |
| 6601 | 2017-03-07 10:57:50.280771 | 192.168.11.2 | 49169 | 192.168.11.3 | 5001 | 892 | 1102037319 | 1102038211 | 2452581237 | |
| 6602 | 2017-03-07 10:57:50.280823 | 192.168.11.3 | 5001 | 192.168.11.2 | 49169 | 0 | 2452581237 | | 1102030019 | 175536 |
| 6603 | 2017-03-07 10:57:50.280984 | 192.168.11.2 | 49169 | 192.168.11.3 | 5001 | 1460 | 1102038211 | 1102039671 | 2452581237 | |
| 6604 | 2017-03-07 10:57:50.280995 | 192.168.11.2 | 49169 | 192.168.11.3 | 5001 | 1460 | 1102039671 | 1102041131 | 2452581237 | |
| 6605 | 2017-03-07 10:57:50.281002 | 192.168.11.2 | 49169 | 192.168.11.3 | 5001 | 1460 | 1102041131 | 1102042591 | 2452581237 | |
| 6605.5 | 2017-03-07 10:57:50.281005 | 192.168.11.4 | 50000 | 192.168.11.3 | 6000 | 1000 | 11000 | 12000 | 3000000 | |
| 6606 | 2017-03-07 10:57:50.281008 | 192.168.11.2 | 49169 | 192.168.11.3 | 5001 | 1460 | 1102042591 | 1102044051 | 2452581237 | |
| 6607 | 2017-03-07 10:57:50.281017 | 192.168.11.2 | 49169 | 192.168.11.3 | 5001 | 1460 | 1102044051 | 1102045511 | 2452581237 | |
| 6608 | 2017-03-07 10:57:50.281023 | 192.168.11.2 | 49169 | 192.168.11.3 | 5001 | 892 | 1102045511 | 1102046403 | 2452581237 | |
| 6609 | 2017-03-07 10:57:50.313442 | 192.168.11.3 | 5001 | 192.168.11.2 | 49169 | 0 | 2452581237 | | 1102031479 | 32708 |
| 6610 | 2017-03-07 10:57:50.313444 | 192.168.11.3 | 5001 | 192.168.11.2 | 49169 | 0 | 2452581237 | | 1102034399 | 32693 |
| 6611 | 2017-03-07 10:57:50.313444 | 192.168.11.3 | 5001 | 192.168.11.2 | 49169 | 0 | 2452581237 | | 1102038211 | 32673 |
| 6611.5 | 2017-03-07 10:57:50.313444 | 192.168.11.3 | 6000 | 192.168.11.4 | 50000 | 0 | 3000000 | | 11000 | 32668 |
| 6612 | 2017-03-07 10:57:50.313445 | 192.168.11.3 | 5001 | 192.168.11.2 | 49169 | 0 | 2452581237 | | 1102041131 | 32450 |
| 6613 | 2017-03-07 10:57:50.313445 | 192.168.11.3 | 5001 | 192.168.11.2 | 49169 | 0 | 2452581237 | | 1102042591 | 32443 |
| 6613.5 | 2017-03-07 10:57:50.313445 | 192.168.11.3 | 6000 | 192.168.11.4 | 50000 | 0 | 3000000 | | 12000 | 32440 |
| 6614 | 2017-03-07 10:57:50.313446 | 192.168.11.3 | 5001 | 192.168.11.2 | 49169 | 0 | 2452581237 | | 1102045511 | 32429 |
| 6615 | 2017-03-07 10:57:50.313638 | 192.168.11.2 | 49169 | 192.168.11.3 | 5001 | 1460 | 1102046403 | 1102047863 | 2452581237 | |
| 6616 | 2017-03-07 10:57:50.313648 | 192.168.11.2 | 49169 | 192.168.11.3 | 5001 | 1460 | 1102047863 | 1102049323 | 2452581237 | |
| 6617 | 2017-03-07 10:57:50.313653 | 192.168.11.2 | 49169 | 192.168.11.3 | 5001 | 1460 | 1102049323 | 1102050783 | 2452581237 | |
| 6618 | 2017-03-07 10:57:50.313662 | 192.168.11.2 | 49169 | 192.168.11.3 | 5001 | 1460 | 1102050783 | 1102052243 | 2452581237 | |
| 6619 | 2017-03-07 10:57:50.313667 | 192.168.11.2 | 49169 | 192.168.11.3 | 5001 | 1460 | 1102052243 | 1102053703 | 2452581237 | |
| 6620 | 2017-03-07 10:57:50.313673 | 192.168.11.2 | 49169 | 192.168.11.3 | 5001 | 892 | 1102053703 | 1102054595 | 2452581237 | |
| 6621 | 2017-03-07 10:57:50.323181 | 192.168.11.3 | 5001 | 192.168.11.2 | 49169 | 0 | 2452581237 | | 1102049323 | 9533 |
| <OMITTED> | | | | | | | | | | |
| 6684 | 2017-03-07 10:57:50.388708 | 192.168.11.3 | 5001 | 192.168.11.2 | 49169 | 0 | 2452581237 | | 1102108127 | 13646 |
| 6685 | 2017-03-07 10:57:50.388708 | 192.168.11.3 | 5001 | 192.168.11.2 | 49169 | 0 | 2452581237 | | 1102111047 | 13632 |

TABULATION PERIOD

FIG.8

FA INFORMATION TABLE T2

| No | TIME | SrcIP | Sport | DestIP | Dport | ACK | RTT | ACK Count | last ACK flag |
|---|---|---|---|---|---|---|---|---|---|
| 6609 | 2017-03-07 10:57:50.313442 | 192.168.11.3 | 5001 | 192.168.11.2 | 49169 | 1102031479 | 32708 | 1 | 0 |
| 6610 | 2017-03-07 10:57:50.313444 | 192.168.11.3 | 5001 | 192.168.11.2 | 49169 | 1102034399 | 32693 | 2 | 0 |
| 6611 | 2017-03-07 10:57:50.313444 | 192.168.11.3 | 5001 | 192.168.11.2 | 49169 | 1102038211 | 32673 | 3 | 0 |
| 6611.5 | 2017-03-07 10:57:50.313444 | 192.168.11.3 | 6000 | 192.168.11.4 | 50000 | 11000 | 32668 | 4 | 0 |
| 6612 | 2017-03-07 10:57:50.313445 | 192.168.11.3 | 5001 | 192.168.11.2 | 49169 | 1102041131 | 32450 | 5 | 0 |
| 6613 | 2017-03-07 10:57:50.313445 | 192.168.11.3 | 5001 | 192.168.11.2 | 49169 | 1102042591 | 32443 | 6 | 0 |
| 6613.5 | 2017-03-07 10:57:50.313445 | 192.168.11.3 | 6000 | 192.168.11.4 | 50000 | 12000 | 32440 | 7 | 0 |
| 6614 | 2017-03-07 10:57:50.313446 | 192.168.11.3 | 5001 | 192.168.11.2 | 49169 | 1102045511 | 32429 | 8 | 1 |
| 6636 | 2017-03-07 10:57:50.341480 | 192.168.11.3 | 5001 | 192.168.11.2 | 49169 | 1102057515 | 18035 | 1 | 0 |
| 6637 | 2017-03-07 10:57:50.341481 | 192.168.11.3 | 5001 | 192.168.11.2 | 49169 | 1102060435 | 18022 | 2 | 0 |
| 6638 | 2017-03-07 10:57:50.341482 | 192.168.11.3 | 5001 | 192.168.11.2 | 49169 | 1102062787 | 18011 | 3 | 0 |
| 6639 | 2017-03-07 10:57:50.341482 | 192.168.11.3 | 5001 | 192.168.11.2 | 49169 | 1102065707 | 17871 | 4 | 1 |
| 6654 | 2017-03-07 10:57:50.360295 | 192.168.11.3 | 5001 | 192.168.11.2 | 49169 | 1102073899 | 18600 | 1 | 0 |
| 6655 | 2017-03-07 10:57:50.360297 | 192.168.11.3 | 5001 | 192.168.11.2 | 49169 | 1102076819 | 18588 | 2 | 0 |
| 6656 | 2017-03-07 10:57:50.360297 | 192.168.11.3 | 5001 | 192.168.11.2 | 49169 | 1102079171 | 18575 | 3 | 0 |
| 6657 | 2017-03-07 10:57:50.360298 | 192.168.11.3 | 5001 | 192.168.11.2 | 49169 | 1102082091 | 17830 | 4 | 0 |
| 6658 | 2017-03-07 10:57:50.360299 | 192.168.11.3 | 5001 | 192.168.11.2 | 49169 | 1102085011 | 17809 | 5 | 1 |
| 6672 | 2017-03-07 10:57:50.374844 | 192.168.11.3 | 5001 | 192.168.11.2 | 49169 | 1102090283 | 14336 | 1 | 0 |
| 6673 | 2017-03-07 10:57:50.374846 | 192.168.11.3 | 5001 | 192.168.11.2 | 49169 | 1102093203 | 14322 | 2 | 0 |
| 6674 | 2017-03-07 10:57:50.374846 | 192.168.11.3 | 5001 | 192.168.11.2 | 49169 | 1102095555 | 14308 | 3 | 1 |
| 6682 | 2017-03-07 10:57:50.388706 | 192.168.11.3 | 5001 | 192.168.11.2 | 49169 | 1102102855 | 27922 | 1 | 0 |
| 6683 | 2017-03-07 10:57:50.388707 | 192.168.11.3 | 5001 | 192.168.11.2 | 49169 | 1102105207 | 13661 | 2 | 0 |
| 6684 | 2017-03-07 10:57:50.388708 | 192.168.11.3 | 5001 | 192.168.11.2 | 49169 | 1102108127 | 13646 | 3 | 0 |
| 6685 | 2017-03-07 10:57:50.388708 | 192.168.11.3 | 5001 | 192.168.11.2 | 49169 | 1102111047 | 13632 | 4 | 1 |

SUCCESSIVE ACK PACKET GROUP 1: rows 6609–6614
SUCCESSIVE ACK PACKET GROUP 2: rows 6636–6639
SUCCESSIVE ACK PACKET GROUP 3: rows 6654–6658
SUCCESSIVE ACK PACKET GROUP 4: rows 6672–6674
SUCCESSIVE ACK PACKET GROUP 5: rows 6682–6685

TABULATION PERIOD

FIG.9

| TIME = TABULATION PERIOD (FA DETERMINATION PERIOD) | WIRELESS LAN TERMINAL | FA AGGREGATION NUMBER | WIRELESS QUALITY |
|---|---|---|---|
| 2017-03-07 10:57 | TERMINAL A | 4.8 | GOOD |
| | TERMINAL B | 4.3 | GOOD |
| | TERMINAL C | 1.1 | BAD |
| | TERMINAL D | 1.3 | BAD |
| | TERMINAL E | 1.5 | BAD |
| 2017-03-07 10:58 | TERMINAL A | 6.2 | GOOD |
| | TERMINAL B | 3.5 | NORMAL |
| | TERMINAL C | 5.2 | GOOD |
| | TERMINAL D | 4.8 | GOOD |
| | TERMINAL E | 1.2 | BAD |

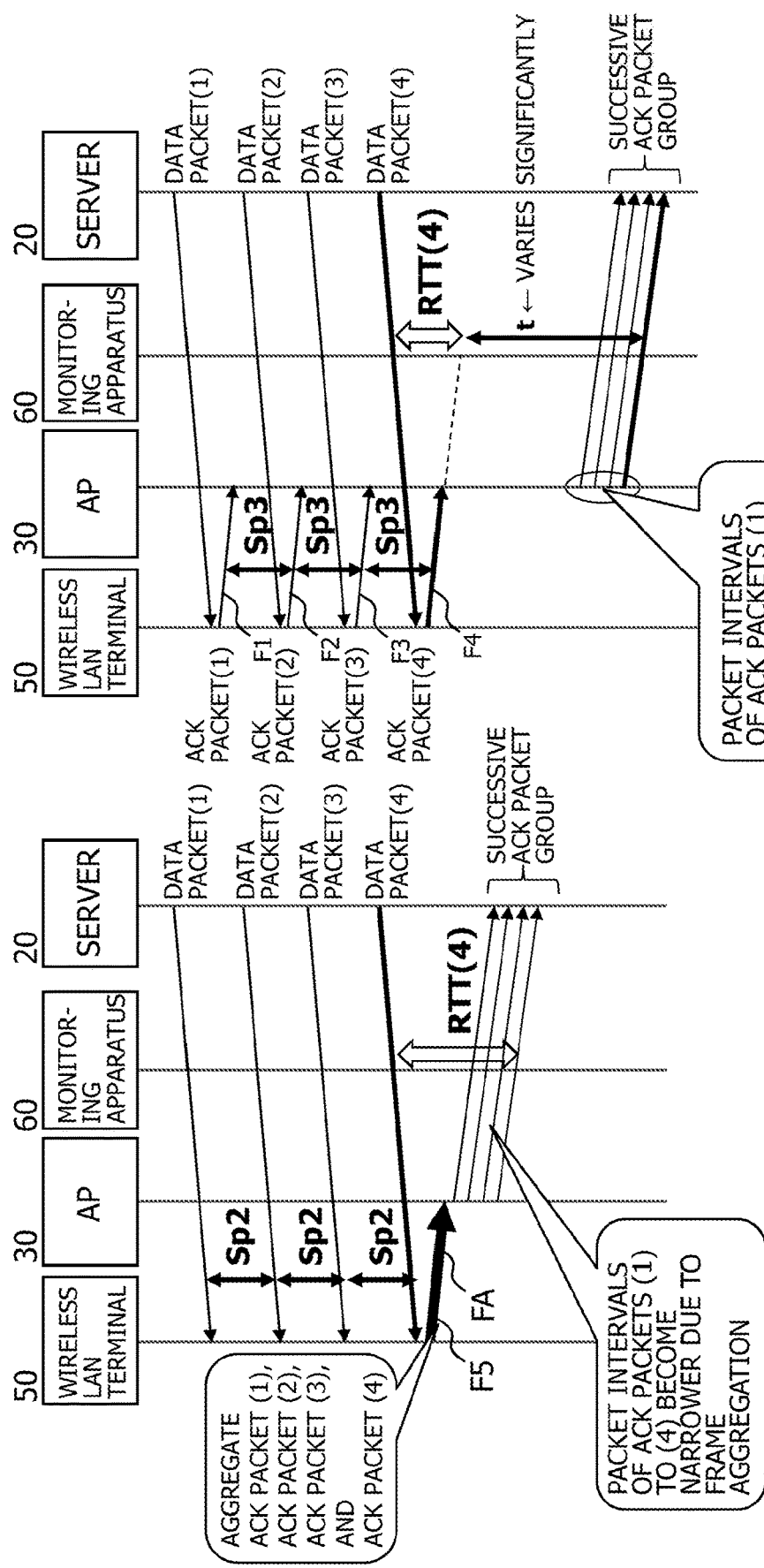

FIG.16A

WIRELESS LAN TERMINAL CONNECTION INFORMATION 31

| TIME = TABULATION PERIOD (FA DETERMINATION PERIOD) | AP | WIRELESS LAN TERMINAL | |
|---|---|---|---|
| 2017-03-07 10:57 | AP30A | TERMINAL 50A | } 31A |
| | | TERMINAL 50B | |
| | AP30B | TERMINAL 50C | } 31B |
| | | TERMINAL 50D | |
| | | TERMINAL 50E | |
| 2017-03-07 10:58 | AP30A | TERMINAL 50A | } 31A |
| | | TERMINAL 50B | |
| | AP30B | TERMINAL 50C | } 31B |
| | | TERMINAL 50D | |
| | | TERMINAL 50E | |

FIG.16B

AP INFORMATION TABLE T3

| TIME = TABULATION PERIOD (FA DETERMINATION PERIOD) | AP | WIRELESS LAN TERMINAL | FA AGGREGATION NUMBER |
|---|---|---|---|
| 2017-03-07 10:57 | AP30A | TERMINAL 50A | 4.8 |
| | | TERMINAL 50B | 4.3 |
| | AP30B | TERMINAL 50C | 1.1 |
| | | TERMINAL 50D | 1.3 |
| | | TERMINAL 50E | 1.5 |
| 2017-03-07 10:58 | AP30A | TERMINAL 50A | 6.2 |
| | | TERMINAL 50B | 3.5 |
| | AP30B | TERMINAL 50C | 5.2 |
| | | TERMINAL 50D | 4.8 |
| | | TERMINAL 50E | 1.2 |

FIG.17A

| TIME = TABULATION PERIOD (FA DETERMINATION PERIOD) | AP | WIRELESS LAN TERMINAL | FA AGGREGATION NUMBER | QUALITY-DETERIORATED LOCATION |
|---|---|---|---|---|
| 2017-03-07 10:57 | AP30A | TERMINAL 50A | 4.8 | NO DETERIORATION (NO BAD TERMINALS) |
| | | TERMINAL 50B | 4.3 | |
| | AP30B | TERMINAL 50C | 1.1 | AP |
| | | TERMINAL 50D | 1.3 | |
| | | TERMINAL 50E | 1.5 | |
| 2017-03-07 10:58 | AP30A | TERMINAL 50A | 6.2 | NO DETERIORATION (NO BAD TERMINALS) |
| | | TERMINAL 50B | 3.5 | |
| | AP30B | TERMINAL 50C | 5.2 | TERMINAL E |
| | | TERMINAL 50D | 4.8 | |
| | | TERMINAL 50E | 1.2 | |

FIG.17B

| TIME = TABULATION PERIOD (FA DETERMINATION PERIOD) | AP | WIRELESS LAN TERMINAL | FA AGGREGATION NUMBER | AVERAGE FA AGGREGATION NUMBER VALUE | AP QUALITY | QUALITY-DETERIORATED LOCATION |
|---|---|---|---|---|---|---|
| 2017-03-07 10:57 | AP30A | TERMINAL 50A | 4.8 | 4.55 | GOOD | NO DETERIORATION (NO BAD TERMINALS) |
| | | TERMINAL 50B | 4.3 | | | |
| | AP30B | TERMINAL 50C | 1.1 | 1.3 | BAD | AP |
| | | TERMINAL 50D | 1.3 | | | |
| | | TERMINAL 50E | 1.5 | | | |
| 2017-03-07 10:58 | AP30A | TERMINAL 50A | 6.2 | 4.85 | GOOD | NO DETERIORATION (NO BAD TERMINALS) |
| | | TERMINAL 50B | 3.5 | | | |
| | AP30B | TERMINAL 50C | 5.2 | 3.73 | NORMAL | TERMINAL E |
| | | TERMINAL 50D | 4.8 | | | |
| | | TERMINAL 50E | 1.2 | | | |

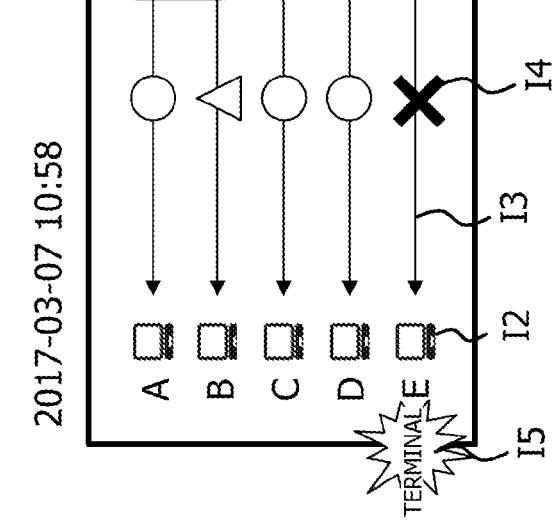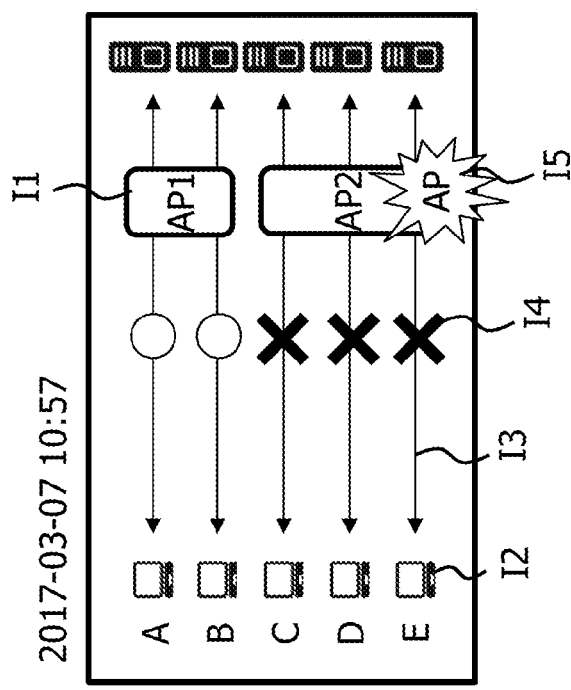

PACKET ANALYSIS PROGRAM, PACKET ANALYZING APPARATUS, AND PACKET ANALYSIS METHOD FOR ESTIMATING WIRELESS QUALITY ACCORDING TO A PACKET ANALYSIS

CROSS-REFERENCE TO RELATED APPLICATION

This application is based upon and claims the benefit of priority of the prior Japanese Patent Application No. 2017-212607, filed on Nov. 2, 2017, the entire contents of which are incorporated herein by reference.

FIELD

The present invention relates to a packet analysis program, a packet analyzing apparatus, and a packet analysis method.

BACKGROUND

Conventionally, methods such as capturing a packet in a wireless section are employed to acquire wireless quality information including received signal strength, a transmission rate, and retransmission information, and, based on the acquired wireless quality information, wireless quality of the wireless section is measured.

Japanese Laid-open Patent Publication No. 2016-72824 relates to wireless quality.

SUMMARY

However, actually capturing a packet in a wireless section involves visiting the site of the wireless section that is a measurement object and also involves measurements to be taken at a plurality of locations, and there is a problem in that actually capturing a packet in a wireless section is labor and time intensive.

According to an aspect of the embodiments, a non-transitory computer-readable storage medium storing therein a packet analysis program for causing a computer to execute a process comprising detecting, from a plurality of received ACK packets, a successive ACK packet group including a plurality of ACK packets for which each reception interval is smaller than a first reference value and in which a round-trip time of each ACK packet becomes shorter in order of reception, and estimating wireless quality based on the number of ACK packets constituting the successive ACK packet group.

According to the present embodiment, wireless quality of a wireless section can be measured with a simple method.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A represents an ACK packet intervals when frame aggregation is not occurred, and FIG. 2B represents an ACK packet intervals when frame aggregation is occurred.

FIG. 7 is an example of the basic information table T1 stored in the storage 63 of the monitoring apparatus 60.

FIG. 8 is an example of the FA information table T2 stored in the storage 63 of the monitoring apparatus 60.

FIG. 9 is an output example of estimated wireless quality.

FIG. 10A represents packet intervals of ACK packets (1) to (4) when frame aggregation is executed, and FIG. 10B represents packet intervals of the ACK packets (1) to (4) when queuing has occurred.

FIG. 16A is an example of the wireless LAN terminal connection information 31 stored, and FIG. 16B is an example of the AP information table T3 stored in the storage 63 of the monitoring apparatus 60.

FIGS. 17A and 17B are output examples of the determination result.

FIGS. 18A and 18B are output examples of the determination result.

DESCRIPTION OF EMBODIMENTS

First Embodiment

Configuration of Information Processing System

Figure 1:
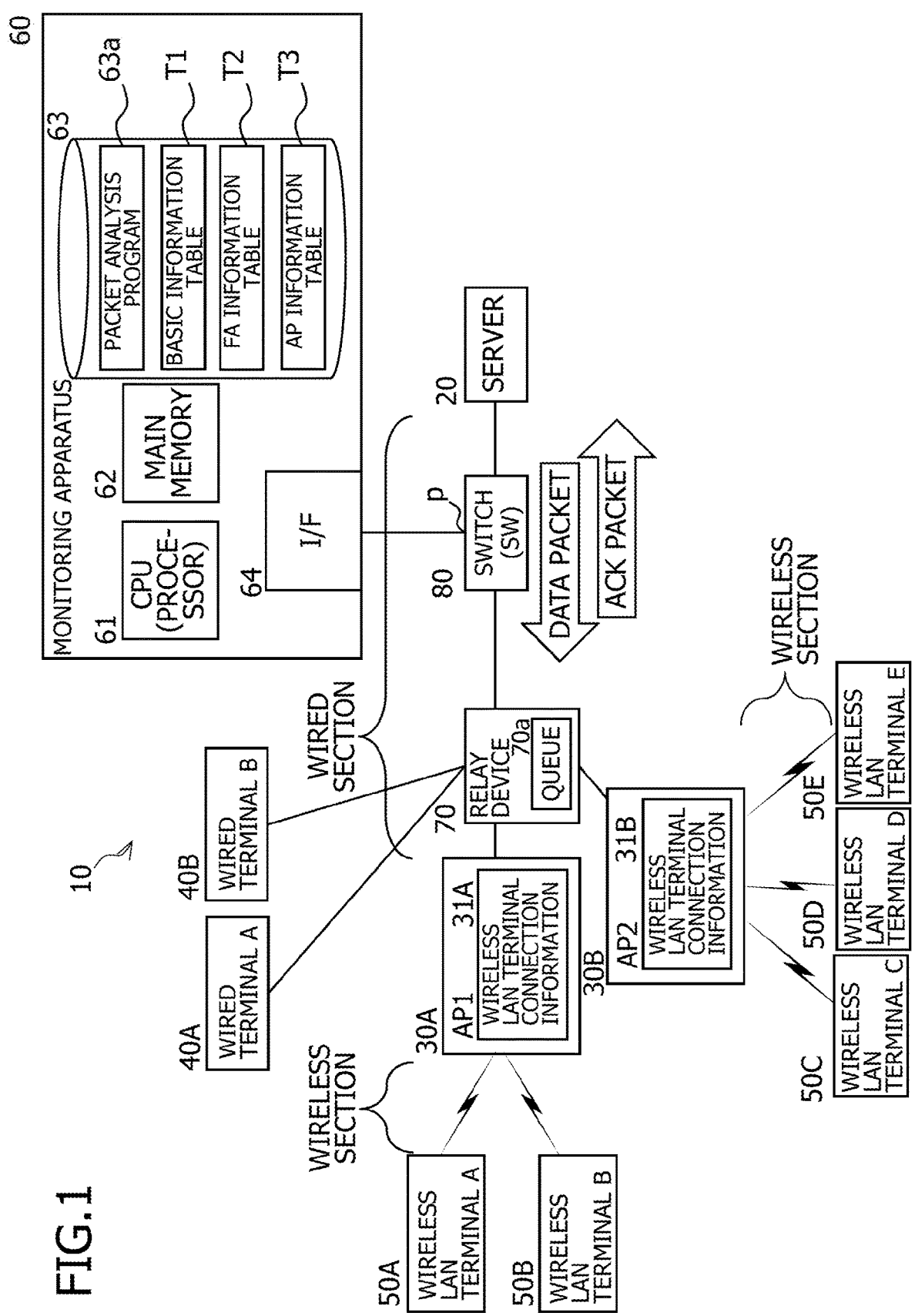
FIG. 1 is a diagram illustrating a configuration of an information processing system 10.

FIG. 1 is a diagram illustrating a configuration of an information processing system 10. The information processing system 10 illustrated in FIG. 1 includes a monitoring apparatus 60 to which a packet analysis program, a packet analyzing apparatus, and a packet analysis method according to the present embodiment have been applied. As illustrated in FIG. 1, the monitoring apparatus 60 is connected to a wired section in a network including wired sections and wireless sections. In addition, as will be described later, by receiving (capturing) a packet transmitted and received in the wired section and executing a wireless quality estimating process, the monitoring apparatus 60 operates as a wireless quality estimating apparatus which estimates wireless quality of the wireless section.

The wired section refers to a wired network section between a server 20 and an access point 30. The wireless section refers to a wireless network section between the access point 30 and a wireless LAN terminal 50. Favorably, the monitoring apparatus 60 is connected to a location where packets transmitted and received between the server 20 and the wireless LAN terminal 50 concentrate in the wired section. For example, when desiring to measure (estimate) wireless quality from the server 20 without visiting the wireless section, the monitoring apparatus 60 is connected to a packet capture position p (refer to FIG. 1) close to the server 20.

The following description assumes that, for example, as illustrated in FIG. 1, the monitoring apparatus 60 is connected to a wired section of a network system including the server 20 which provides a prescribed service, access points 30A and 30B, wired terminals 40A and 40B, wireless LAN terminals 50A to 50E, a relay device 70, and a switch 80. Hereinafter, when the access points 30A and 30B, the wired terminals 40A and 40B, and the wireless LAN terminals 50A to 50E are not particularly distinguished from each other, descriptions of an access point (AP) 30, a wired terminal 40, and a wireless LAN terminal 50 will be used.

Although not illustrated, the server 20 is constituted by, for example, a server computer including a processor and a main memory and is connected to a wired section. By executing a prescribed program, the server 20 provides the wireless LAN terminal 50 with a prescribed service. In doing so, the server 20 communicates with the wireless LAN terminal 50 using the TCP protocol. The server 20 transmits, for example, a DATA packet addressed to the wireless LAN terminal 50. The DATA packet addressed to the wireless LAN terminal 50 is delivered to the wireless LAN terminal 50 via the wired section and a wireless section.

Although not illustrated, the wireless LAN terminal 50 is constituted by, for example, a computer including a processor and a main memory and is connected to a wireless section. The wireless LAN terminal 50 is an example of a wireless terminal. By executing a prescribed program, the wireless LAN terminal 50 connects to the server 20 via the wireless section and a wired section and communicates with the server 20 using the TCP protocol.

When the wireless LAN terminal 50 receives a DATA packet transmitted by the server 20 and addressed to the wireless LAN terminal 50, the wireless LAN terminal 50 wirelessly transmits an ACK packet addressed to the server 20 in a wireless frame. In doing so, frame aggregation (hereinafter, also referred to as FA) may be used when wirelessly transmitting a plurality of ACK packets. A frame aggregation will be described later. The ACK packet addressed to the server 20 is delivered to the server 20 via the wireless section and the wired section.

Although not illustrated, the wired terminal 40 is constituted by, for example, a computer including a processor and a main memory and is connected to a wired section via the relay device 70. By executing a prescribed program, the wired terminal 40 connects to the server 20 via the relay device 70 and the wired section and communicates with the server 20 using the TCP protocol. Moreover, an example of using the wired terminal 40 will be described in a second embodiment.

The AP 30 is a device which is provided between a wired section and a wireless section and which relays packets (for example, a DATA packet and an ACK packet) between the wired section and the wireless section. An AP 30A has wireless LAN terminal connection information 31A stored in a memory thereof, and an AP 30B has wireless LAN terminal connection information 31B stored in a memory thereof. Hereinafter, when the pieces of wireless LAN terminal connection information 31A and 31B are not particularly distinguished from one another, a description of wireless LAN terminal connection information 31 will be used. Moreover, the wireless LAN terminal connection information 31 will be described in a third embodiment.

The relay device 70 is connected between the AP 30 and the packet capture position p in a wired section, and includes a queue 70a in which arrived packets are queued in the order of arrival. For example, the relay device 70 is a layer 2 switch or a router. Moreover, an example of using the relay device 70 will be described in the second embodiment.

The monitoring apparatus 60 is constituted by a computer having hardware such as a central processing unit 61 (CPU: hereinafter, referred to as a processor 61), a main memory 62, a storage 63 which is a large capacity memory, and an I/F 64, and is connected to a wired section via the I/F 64. Although a description will be provided later, the storage 63 stores a packet analysis program 63a, a basic information table T1, a frame aggregation (FA) information table T2, and an AP information table T3. Moreover, the AP information table T3 will be described in the third embodiment.

The monitoring apparatus 60 is connected to the wired section in a network including wired sections and wireless sections in order to receive (capture) packets transmitted and received in the wired section such as a DATA packet transmitted by the server 20 and addressed to the wireless LAN terminal 50 and an ACK packet transmitted by the wireless LAN terminal 50 and addressed to the server 20.

Specifically, the monitoring apparatus 60 is connected via the I/F 64 to a switch 80 (hereinafter, referred to as a SW 80) that is an L2 switch (a mirror port) provided in the wired section. Moreover, the monitoring apparatus 60 may be connected to a TAP or a repeater hub which is a network signal branching apparatus provided in the wired section instead of to the SW 80.

When the processor 61 executes the packet analysis program 63a deployed on the main memory 62, the monitoring apparatus 60 receives (captures) packets transmitted and received in the wired section such as a DATA packet transmitted by the server 20 and addressed to the wireless LAN terminal 50 and an ACK packet transmitted by the wireless LAN terminal 50 and addressed to the server 20, the packets being received at the packet capture position p near the server 20.

In addition, when the processor 61 executes the packet analysis program 63a, the monitoring apparatus 60 detects, from the received packets, a group of ACK packets (hereinafter, referred to as a successive ACK packet group) of which packet intervals have been narrowed due to a plurality of ACK packets being aggregated in a single wireless frame by frame aggregation (to be described later) executed by the wireless LAN terminal 50.

Furthermore, when the processor 61 executes the packet analysis program 63a, the monitoring apparatus 60 estimates wireless quality of the wireless section based on the number of ACK packets constituting the detected successive ACK packet group.

As described above, when the processor 61 executes the packet analysis program 63a, the monitoring apparatus 60 operates as a wireless quality estimating apparatus which estimates the wireless quality of a wireless section.

Frame Aggregation

FIG. 2A represents an ACK packet when frame aggregation is not executed by the wireless LAN terminal 50, and FIG. 2B represents an ACK packet when frame aggregation is executed by the wireless LAN terminal 50.

For example, when the wireless LAN terminal 50 receives a plurality of DATA packets (1) to (4) transmitted by the server 20 and addressed to the wireless LAN terminal 50, the wireless LAN terminal 50 wirelessly transmits a plurality of ACK packets (1) to (4) corresponding to the plurality of DATA packets (1) to (4) in a wireless frame.

In doing so, the wireless LAN terminal 50 may respectively wirelessly transmit the plurality of ACK packets (1) to (4) in separate wireless frames F1 to F4 as illustrated in FIG. 2A or may aggregate the plurality of ACK packets (1) to (4) and wirelessly transmit the plurality of aggregated ACK packets (1) to (4) in a single wireless frame F5 as illustrated in FIG. 2B. A technique for aggregating a plurality of ACK packets and wirelessly transmitting the plurality of aggregated ACK packets in a single wireless frame F5 in an efficient manner as in the latter case is referred to as frame aggregation. As a method of frame aggregation, either aggregation MAC service data unit (A-MSDU) which combines data portions of a plurality of frames (for example, MAC frames) into one or aggregation MAC protocol data unit (A-MPDU) which combines header portions, data portions, and frame check sequence (FCS) portions of a plurality of frames (for example, MAC frames) into one may be used.

Packet Intervals of ACK Packets

Packet intervals of ACK packets when frame aggregation is not executed by the wireless LAN terminal 50 will be described with reference to FIG. 2A.

As illustrated in FIG. 2A, for example, in a case where the plurality of DATA packets (1) to (4) transmitted by the server 20 and addressed to the wireless LAN terminal 50 are transmitted at packet intervals Sp1 in the wired section, when a communication speed of the wireless section is slower than that of the wired section, the plurality of DATA packets (1) to (4) are delivered to the wireless LAN terminal 50 while being transmitted at wider packet intervals Sp2 than the packet intervals Sp1.

When the wireless LAN terminal 50 receives the plurality of DATA packets (1) to (4), the wireless LAN terminal 50 respectively transmits, in the order of reception, a plurality of ACK packets (1) to (4) corresponding to the plurality of received DATA packets (1) to (4) in separate wireless frames F1 to F4. In doing so, every time an ACK packet is wirelessly transmitted, a transmission wait time (distributed access inter frame space (DIFS)+random time) due to carrier sense multiple access/collision avoidance (CSMA/CA) occurs.

Therefore, the ACK packets (1) to (4) are transmitted in the wireless section at packet intervals Sp3 obtained by adding the transmission wait time to the packet intervals Sp2, and are also transmitted in the wired section at the packet intervals Sp3 to be delivered to the server 20. As a result, as illustrated in FIG. 2A, reception intervals of the plurality of ACK packets (1) to (4) at the monitoring apparatus 60 are the packet intervals Sp3 which are wider than packet intervals Sp4 to be described later (refer to FIG. 2B).

Next, packet intervals of ACK packets when frame aggregation is executed by the wireless LAN terminal 50 will be described with reference to FIG. 2B.

As illustrated in FIG. 2B, for example, in a case where the plurality of DATA packets (1) to (4) transmitted by the server 20 and addressed to the wireless LAN terminal 50 are transmitted at packet intervals Sp1 in the wired section, when a communication speed of the wireless section is slower than that of the wired section, the plurality of DATA packets (1) to (4) are delivered to the wireless LAN terminal 50 while being transmitted at wider packet intervals Sp2 than the packet intervals Sp1.

When the wireless LAN terminal 50 receives the plurality of DATA packets (1) to (4), the wireless LAN terminal 50 aggregates the plurality of ACK packets (1) to (4) corresponding to the plurality of received DATA packets (1) to (4) and transmits the plurality of aggregated ACK packets in a single wireless frame F5. Reference symbol F5 in FIG. 2B denotes a frame subjected to frame aggregation (FA). In addition, the ACK packets (1) to (4) are restored to the individual ACK packets (1) to (4) prior to the aggregation at the AP 30, transmitted to the wired section at the packet intervals Sp4 which are narrower than the packet intervals Sp3, and transmitted and delivered to the server 20 at the packet intervals Sp4.

In this manner, when frame aggregation is being executed by the wireless LAN terminal 50, the plurality of ACK packets (1) to (4) are transmitted in the wired section as a group of ACK packets (in other words, a successive ACK packet group) with packet intervals being narrowed to the packet intervals Sp4. As a result, as illustrated in FIG. 2B, the reception intervals of the plurality of ACK packets (1) to (4) at the monitoring apparatus 60 are the packet intervals Sp4 which are narrower than the packet intervals Sp3 (refer to FIG. 2A).

Relationship Between Number of ACK Packets Aggregated into One Wireless Frame and Wireless Quality The number of ACK packets aggregated into one wireless frame by frame aggregation increases or decreases in accordance with an amount of communication and quality corresponding to a wireless status such as received signal strength and radio wave interference of the wireless section.

For example, when the amount of communication in the wireless section is small and wireless quality thereof is good, the number of ACK packets aggregated into one wireless frame increases with each successful transmission of a wireless frame. For example, when the wireless LAN terminal 50 succeeds in transmitting one wireless frame aggregating three ACK packets, the wireless LAN terminal 50 next transmits one wireless frame aggregating five ACK packets, when the wireless LAN terminal 50 succeeds in transmitting the one wireless frame aggregating five ACK packets, the wireless LAN terminal 50 next transmits one wireless frame aggregating ten ACK packets, and when the wireless LAN terminal 50 fails to transmit the one wireless frame aggregating ten ACK packets, the wireless LAN terminal 50 next wirelessly transmits one wireless frame aggregating five ACK packets.

On the other hand, when the amount of communication in the wireless section is large and the wireless quality thereof is bad, the number of ACK packets aggregated into one wireless frame decreases with each unsuccessful transmission of a wireless frame. For example, when the wireless LAN terminal 50 fails to transmit one wireless frame aggregating ten ACK packets, the wireless LAN terminal 50 next transmits one wireless frame aggregating five ACK packets, when the wireless LAN terminal 50 fails to transmit the one wireless frame aggregating five ACK packets, the wireless LAN terminal 50 next transmits one wireless frame aggregating three ACK packets, and when the wireless LAN terminal 50 succeeds in transmitting the one wireless frame aggregating three ACK packets, the wireless LAN terminal 50 next wirelessly transmits one wireless frame aggregating five ACK packets.

As described above, the number of ACK packets aggregated into one wireless frame by frame aggregation increases or decreases in accordance with an amount of communication and quality corresponding to a wireless status such as received signal strength and radio wave interference of the wireless section. In other words, the number of ACK packets aggregated into one wireless frame represents the wireless quality of the wireless section.

Operation Example of Monitoring Apparatus 60

Figure 3:
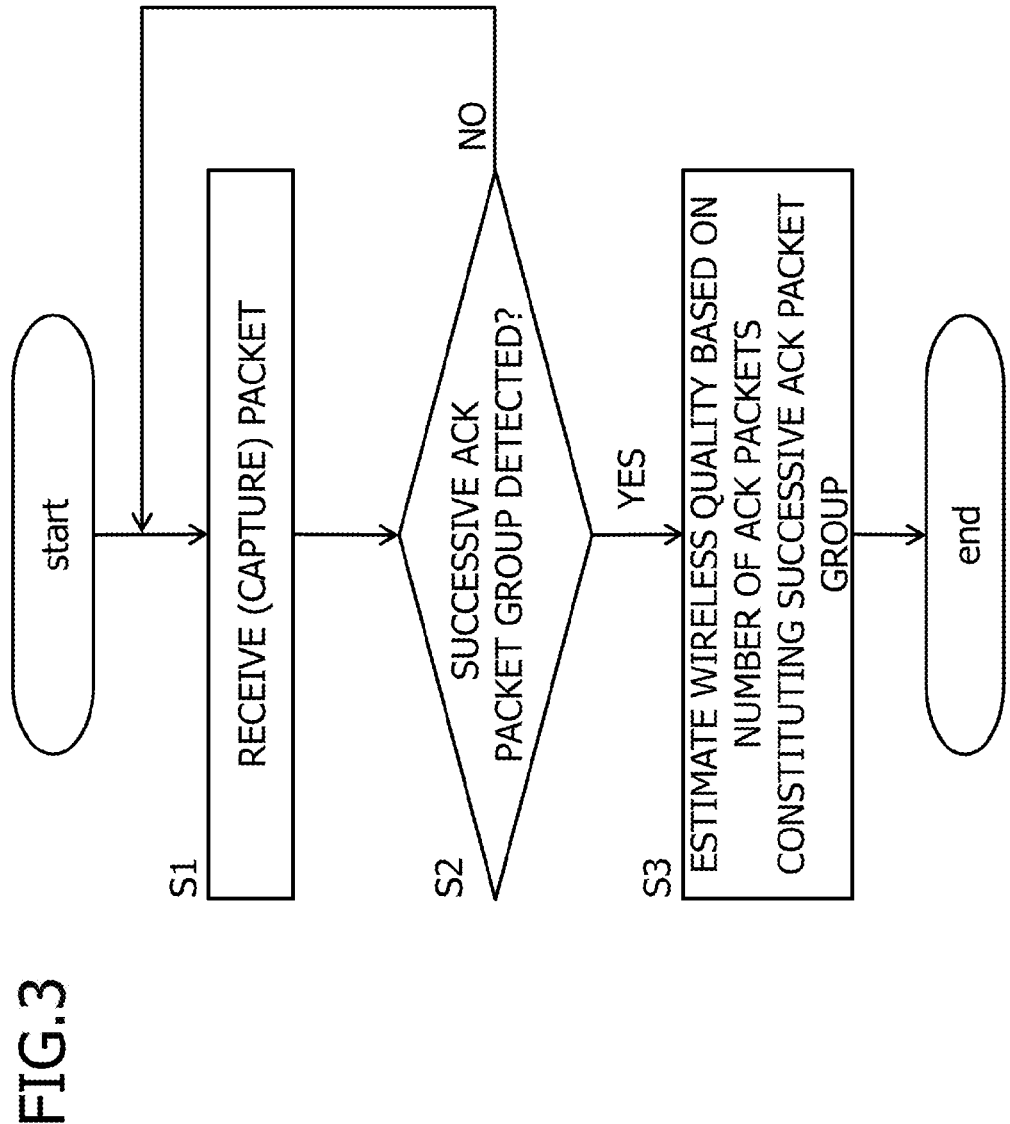
FIG. 3 is a flow chart of a wireless quality estimating process (summary) executed by the monitoring apparatus 60.

FIG. 3 is a flow chart of a wireless quality estimating process (summary) executed by the monitoring apparatus 60.

When the processor 61 executes the packet analysis program 63a deployed on the main memory 62, the monitoring apparatus 60 receives (captures) packets transmitted and received in the wired section such as a DATA packet transmitted by the server 20 and addressed to the wireless LAN terminal 50 and an ACK packet transmitted by the wireless LAN terminal 50 and addressed to the server 20 (S1). In addition, the processor 61 executes a process of detecting, from the received packets, a group of ACK packets (in other words, a successive ACK packet group) of which packet intervals have been narrowed due to the ACK packets being aggregated in a single wireless frame by frame aggregation executed by the wireless LAN terminal 50 (S2), and when a successive ACK packet group is detected (S2: YES), the processor 61 executes a process of estimating the wireless quality of the wireless section based on the number of ACK packets constituting the detected successive ACK packet group (S3).

In the process of receiving packets (S1), a process of extracting ACK packets from the received packets and, further, classifying the ACK packets for each wireless LAN terminal 50 is executed. In addition, the processes of S2 and S3 are executed with respect to the classified ACK packets.

In the process of detecting a successive ACK packet group (S2), a successive ACK packet group or, in other words, a plurality of ACK packets satisfying two conditions including a first condition where reception intervals of successive ACK packets are smaller than a first reference value and a second condition where an RTT (round-trip time) of each ACK packet becomes shorter in the order of reception are detected from the classified ACK packets. An RTT refers to a round-trip time calculated by subtracting, from a reception time point at which the monitoring apparatus 60 receives an ACK packet, a reception time point at which the monitoring apparatus 60 receives a DATA packet corresponding to the ACK packet. A specific example of RTT calculation will be described later.

Conditions for Detecting Successive ACK Packet Group

A first condition where reception intervals of successive ACK packets are smaller than a first reference value will be described.

As illustrated in FIGS. 2A and 2B, when frame aggregation is executed by the wireless LAN terminal 50, the reception intervals of a plurality of ACK packets by the monitoring apparatus 60 are narrower than when frame aggregation is not executed by the wireless LAN terminal 50.

Therefore, as a condition for detecting a successive ACK packet group returned by frame aggregation while distinguishing the successive ACK packet group from a successive ACK packet group not subjected to frame aggregation, the first condition where reception intervals of successive ACK packets are smaller than a first reference value is adopted. As the first reference value, a time (for example, 10 μsec) which enables FIG. 2A and FIG. 2B to be distinguished from each other is selected.

Next, a second condition where the RTT of each ACK packet becomes shorter in the order of reception will be described.

Figure 4:
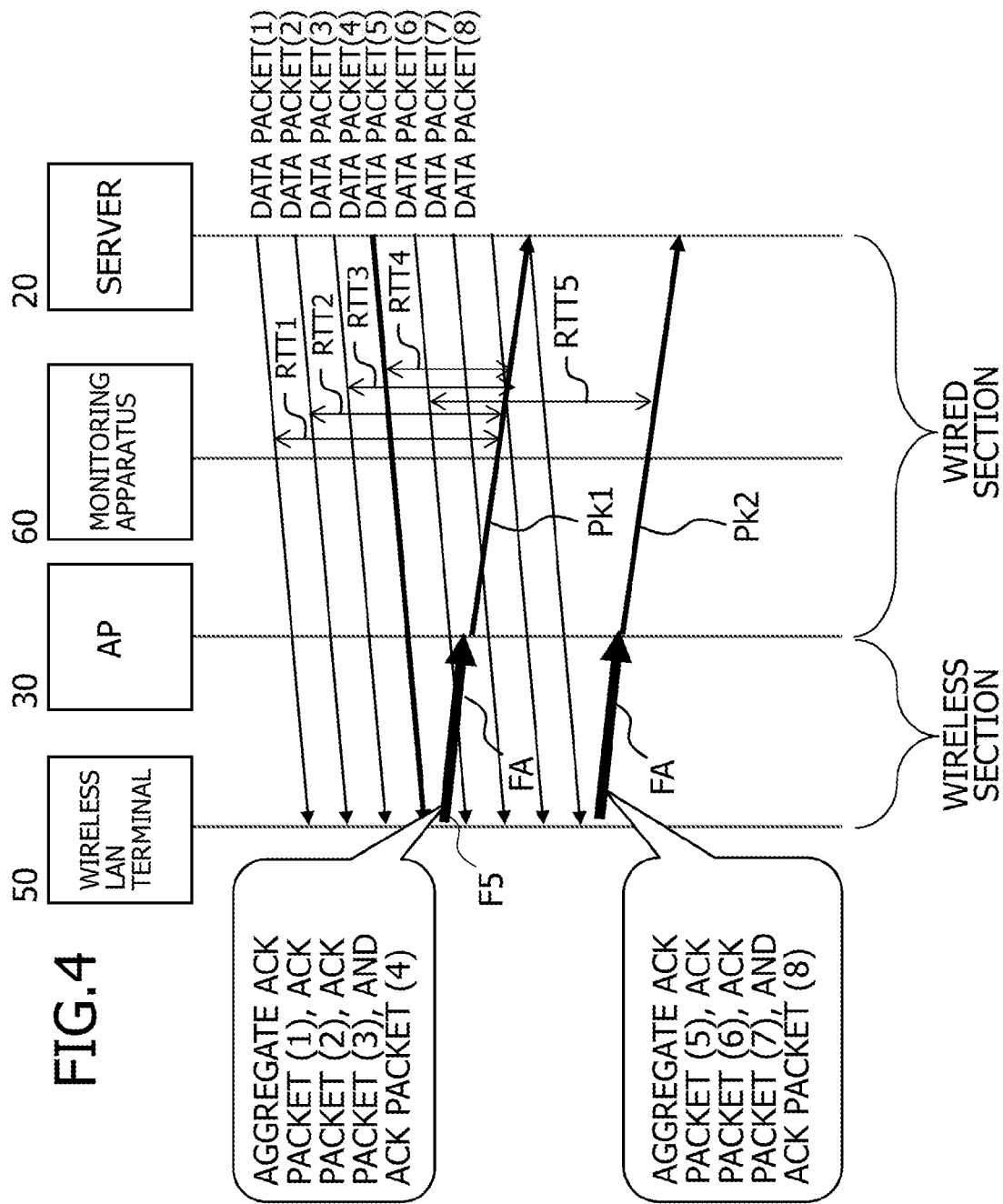
FIG. 4 represents RTT1 to RTT4 of ACK packets (1) to (4) constituting one successive ACK packet group as well as RTT5 of an ACK packet (5) constituting another successive ACK packet group.

FIG. 4 represents RTT1 to RTT4 of ACK packets (1) to (4) constituting one successive ACK packet group as well as RTT5 of an ACK packet (5) constituting another successive ACK packet group.

RTT1 is calculated by subtracting a reception time point of the DATA packet (1) by the monitoring apparatus 60 from a reception time point of the ACK packet (1) by the monitoring apparatus 60. RTT2 to RTT5 are calculated in a similar manner.

As described with reference to FIG. 2B, the packet intervals Sp4 of the plurality of ACK packets (1) to (4) in the wired section are significantly narrow (for example, around 1 to 2 μsec) as compared to the packet intervals Sp1. As a result, as illustrated in FIG. 4, RTT1, RTT2, RTT3, and RTT4 of the ACK packets (1) to (4) constituting the single successive ACK packet group become shorter in this order. While the plurality of ACK packets (1) to (4) in the wired section are represented by four arrows of the packet intervals Sp4 in FIG. 2B, the plurality of ACK packets (1) to (4) are represented by one arrow Pk1 in FIG. 4. A plurality of ACK packets (5) to (8) in the wired section are similarly represented by one arrow Pk2 in FIG. 4.

On the other hand, as illustrated in FIG. 4, RTT1 of the first ACK packet (1) constituting one successive ACK packet group and RTT5 of the first ACK packet (5) constituting the other successive ACK packet group are approximately the same time. As a result, RTT4 of the last ACK packet (4) constituting the one successive ACK packet group and RTT5 of the first ACK packet (5) constituting the other successive ACK packet group satisfy RTT5>RTT4, and become longer in this order instead of becoming shorter.

In consideration thereof, as a condition of detecting a successive ACK packet group, the second condition where the RTT of each ACK packet becomes shorter in the order of reception is adopted. Due to this condition, one successive ACK packet group and another successive ACK packet group can be detected while being distinguished from each other.

Returning now to FIG. 3, in the process of estimating the wireless quality of the wireless section (S3), it is estimated that the larger the number of ACK packets, the higher the quality, and the smaller the number of ACK packets, the lower the quality. For example, a first threshold and a second threshold that is smaller than the first threshold are used. When the number of ACK packets constituting a successive ACK packet group exceeds the first threshold, it is estimated that the wireless quality is good. When the number of ACK packets constituting a successive ACK packet group is between the first threshold and the second threshold, it is estimated that the wireless quality is normal. When the number of ACK packets constituting a successive ACK packet group does not exceed the second threshold, it is estimated that the wireless quality is bad.

As described above, according to the present embodiment, the monitoring apparatus 60 receives (captures) packets transmitted and received in the wired section and detects a group of ACK packets (in other words, a successive ACK packet group) of which packet intervals have been narrowed due to the ACK packets being aggregated in a single wireless frame by frame aggregation executed by the wireless LAN terminal 50. In other words, a successive ACK packet group including a plurality of ACK packets satisfying two conditions including a first condition where reception intervals of successive ACK packets are smaller than a first reference value and a second condition where an RTT (round-trip time) of each ACK packet becomes shorter in the order of reception are detected. In addition, wireless quality of the wireless section is estimated based on the number of ACK packets constituting the detected successive ACK packet group. Therefore, the wireless quality of a wireless section can be measured with a simple method without having to capture packets in the wireless section or, in other words, without being based on wireless quality information as in conventional art.

Figure 5:
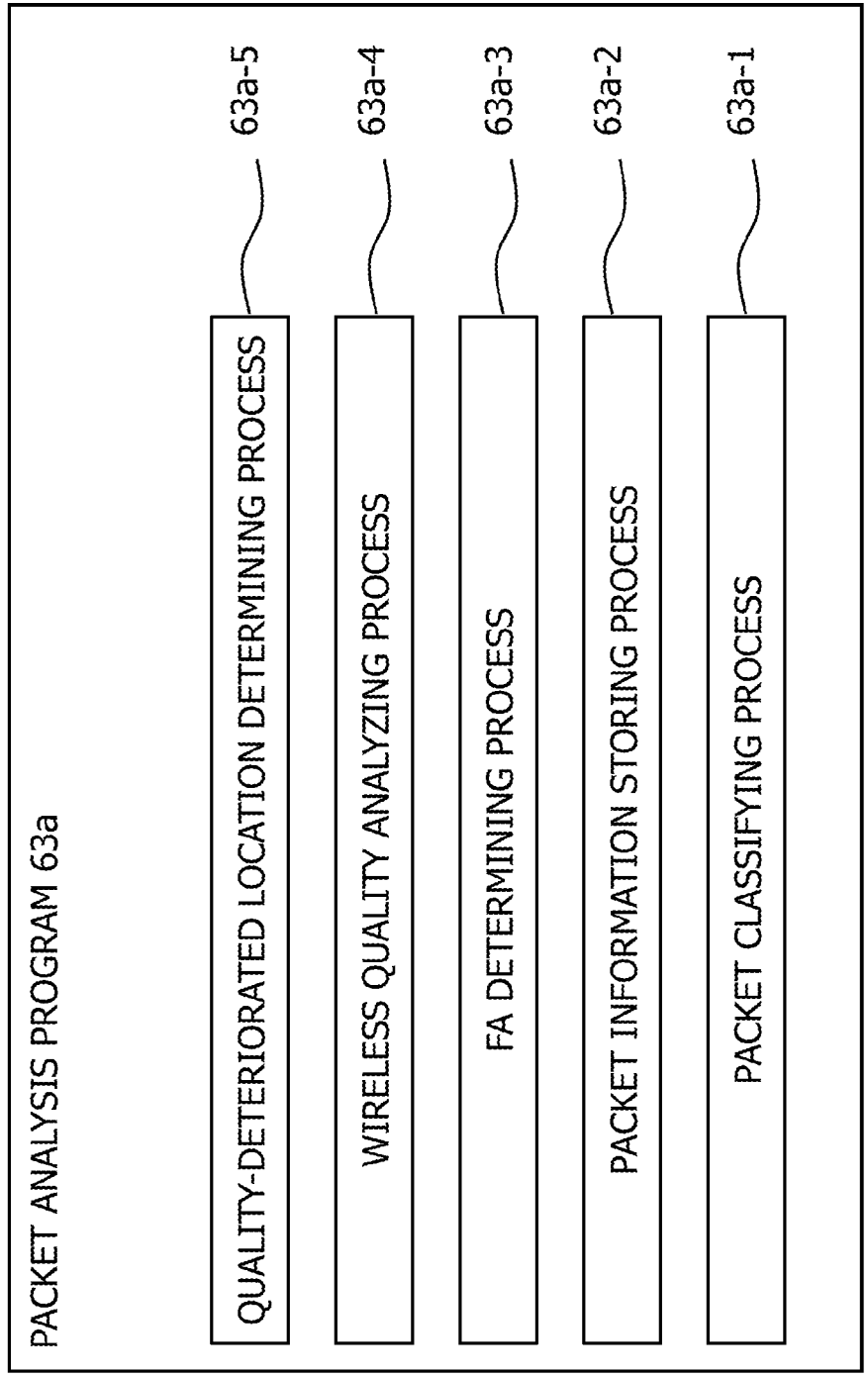
FIG. 5 is an example of a functional configuration of the packet analysis program 63a stored in the storage 63 of the monitoring apparatus 60.

FIG. 5 is an example of a functional configuration of the packet analysis program 63a stored in the storage 63 of the monitoring apparatus 60.

As illustrated in FIG. 5, the packet analysis program 63a includes a packet classifying process 63a-1, a packet information storing process 63a-2, an FA determining process 63a-3, a wireless quality analyzing process 63a-4, and a quality-deteriorated location determining process 63a-5. Each process will be described with reference to FIG. 6. Moreover, the quality-deteriorated location determining process 63a-5 will be described in the third embodiment.

Figure 6:
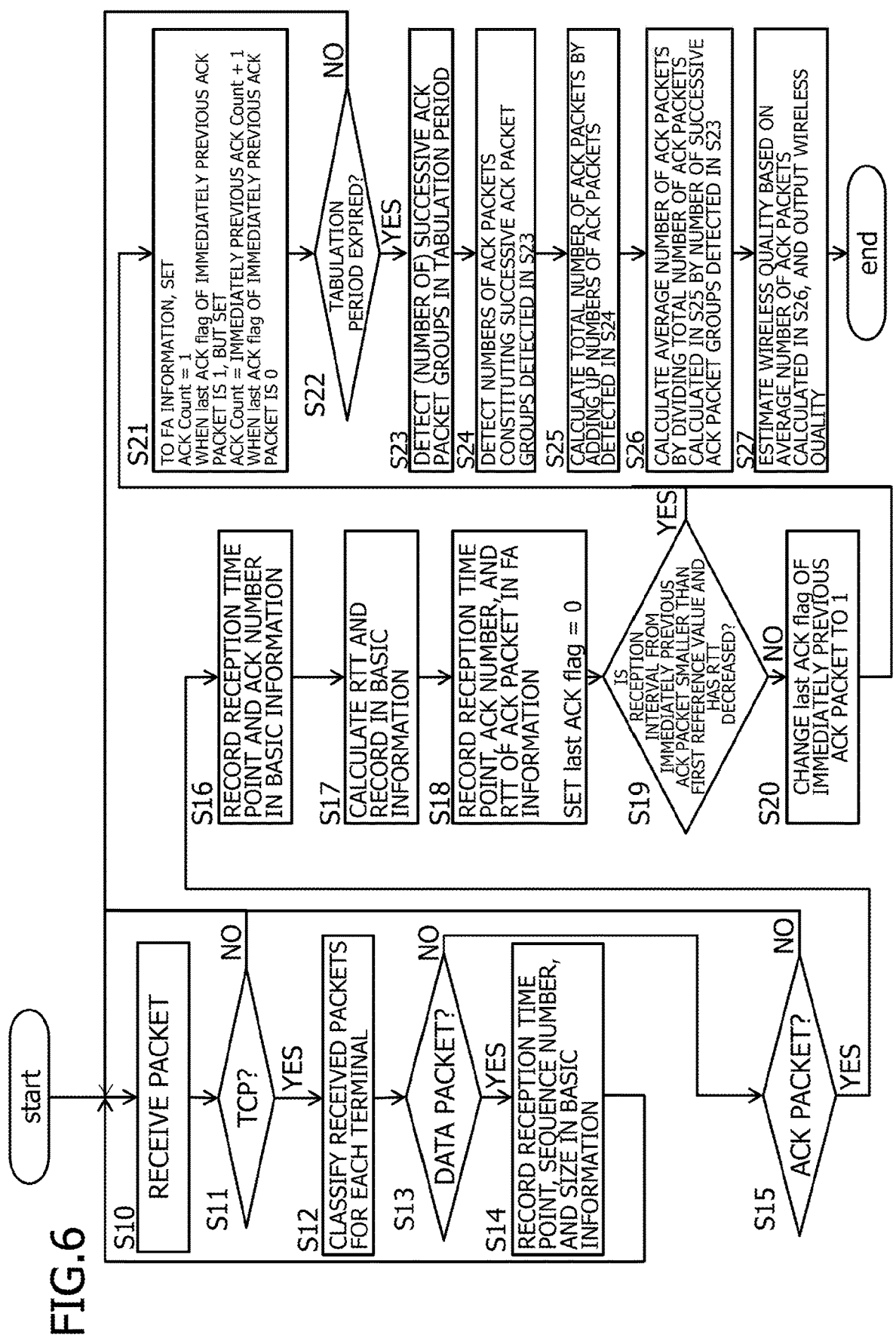
FIG. 6 is a flow chart of a wireless quality estimating process (detailed) executed by the monitoring apparatus 60.

FIG. 6 is a flow chart of a wireless quality estimating process (detailed) executed by the monitoring apparatus 60.

The following process is realized when the processor 61 of the monitoring apparatus 60 executes the packet analysis program 63a.

The basic information table T1 and the FA information table T2 are created when the processes of steps S10 to S22 are executed for a tabulation period (also referred to as an FA determination period: for example, one minute) determined in advance. Moreover, the tabulation period is stored in, for example, the storage 63 of the monitoring apparatus 60.

Basic Information Table T1

FIG. 7 is an example of the basic information table T1 stored in the storage 63 of the monitoring apparatus 60. The basic information table T1 is a table which records information related to packets (DATA packets and ACK packets) received (captured) by the monitoring apparatus 60 in the order of reception of the packets and which is created for each wireless LAN terminal 50. FIG. 7 is an example of the basic information table T1 of the wireless LAN terminal 50A of which an IP address is 192.168.11.3. In the present embodiment, the basic information table T1 is mainly used to calculate an RTT.

The basic information table T1 includes, as items, No., TIME, SrcIP (Source IP Address), Sport (Source Port), DestIP (Destination IP Address), Dport (Destination Port), TCP LEN, SEQ (sequence number), NextSEQ, ACK, and RTT.

A number identifying each row is recorded in the No. item. Note that No. is added for the sake of describing the embodiment and is actually not recorded. A No. including a decimal point such as 6596.5 indicates that the row is a separate TCP connection from a No. that does not include a decimal point.

A time point of reception of a packet by the monitoring apparatus 60 is recorded in the TIME item.

An IP address of a transmission source of the packet is recorded in the SrcIP item. 192.168.11.2 represents an IP address of the server 20, 192.168.11.4 represents an IP address of a different server (not illustrated), and 192.168.11.3 represents an IP address of the wireless LAN terminal 50.

A port number of the transmission source is recorded in the Sport item.

An IP address of a destination is recorded in the DestIP item.

A port number of the destination is recorded in the Dport item.

SrcIP: 192.168.11.2, Sport: 49169, DestIP: 192.168.11.3, and Dport: 5001 (and SrcIP: 192.168.11.3, Sport: 5001, DestIP: 192.168.11.2, and Dport: 49169 of which the transmission source and the destination have been reversed) represent a single TCP connection between the server 20 and the wireless LAN terminal 50A.

In addition, SrcIP: 192.168.11.4, Sport: 50000, DestIP: 192.168.11.3, and Dport: 6000 (and SrcIP: 192.168.11.3, Sport: 6000, DestIP: 192.168.11.4, and Dport: 50000 of which the transmission source and the destination have been reversed) represent another TCP connection between the server 20 and the wireless LAN terminal 50A. In other words, FIG. 7 is an example of a case where there are two TCP connections between the server 20 and the wireless LAN terminal 50A. There may be only one TCP connection or there may be three or more TCP connections between the server 20 and the wireless LAN terminal 50A.

A size of a TCP payload included in the packet is recorded in the TCP LEN item. A row in which the TCP LEN item is other than 0 (for example, a row of No. 6596 which is the first row) represents information of a DATA packet. A row in which the TCP LEN item is 0 (for example, a row of No. 6609) represents information of an ACK packet.

A sequence number is recorded in the SEQ item. The sequence number is a serial number added to a packet.

A sequence number of a next packet which is a sum of a value of TCP LEN and a value of SEQ is recorded in the NextSEQ item. Note that NextSEQ is added for the sake of describing the embodiment and is actually not recorded.

An ACK number is recorded in the ACK item.

A value of an RTT (round-trip time) is recorded in the RTT item.

An example of calculating an RTT will be described.

An RTT can be calculated based on a reception time point of an ACK packet and a reception time point of a DATA packet corresponding to the ACK packet.

For example, the reception time point of an ACK packet of No. 6609 is 2017-03-07 10:57:50.313442. In addition, the DATA packet corresponding to the ACK packet of No. 6609 is a DATA packet of No. 6596 of which the NextSEQ (1102031479) matches the ACK (1102031479) of the ACK packet of No. 6609, and the reception time point of the DATA packet of No. 6596 is 2017-03-07 10:57:50.280734.

In this case, the RTT is calculated as 50.313442−50.280734=32708 and recorded in the RTT item of the row of No. 6609.

Moreover, a DATA packet corresponding to an ACK packet is retrieved from within the same TCP connection by referring to the basic information table T1. It is determined to be the same TCP connection when port numbers are the same.

FA Information Table T2

FIG. 8 is an example of the FA information table T2 stored in the storage 63 of the monitoring apparatus 60. The FA information table T2 is a table which records, in the order of reception of packets, information related to ACK packets in the basic information table T1 created for each wireless LAN terminal 50. FIG. 8 is an example of the FA information table T2 of the wireless LAN terminal 50A of which the IP address is 192.168.11.3. As will be described later, the FA information table T2 is referenced in order to detect a successive ACK packet group and to detect the number of ACK packets constituting the successive ACK packet group, and the FA information table T2 indicates a detected successive ACK packet group and the number of ACK packets constituting the detected successive ACK packet group.

The FA information table T2 includes, as items, No., TIME, SrcIP (Source IP Address), Sport (Source Port), DestIP (Destination IP Address), Dport (Destination Port), ACK, RTT, ACK Count, and last ACK flag.

The items of No., TIME, SrcIP (Source IP Address), Sport (Source Port), DestIP (Destination IP Address), Dport (Destination Port), ACK, and RTT are similar to those of the basic information table T1.

A consecutive number beginning with 1 is recorded in the ACK Count item. ACK packets in which consecutive numbers beginning with 1 are recorded constitute one successive ACK packet group. For example, a total of eight ACK packets of Nos. 6609 to 6614 in which 1 to 8 are recorded constitute one successive ACK packet group, and a total of four ACK packets of Nos. 6636 to 6639 in which 1 to 4 are recorded constitute another successive ACK packet group. In a similar manner, a total of five ACK packets of Nos. 6654 to 6658 in which 1 to 5 are recorded, a total of three ACK packets of Nos. 6672 to 6674 in which 1 to 3 are recorded, and a total of four ACK packets of Nos. 6682 to 6685 in which 1 to 4 respectively constitute successive ACK packet groups.

An identifier "1" indicating that an ACK packet is a last ACK packet of one successive ACK packet group or an identifier "0" indicating that an ACK packet is not a last ACK packet of one successive ACK packet group is recorded in the last ACK flag item.

Next, the wireless quality estimating process (detailed) executed by the monitoring apparatus 60 will be described with reference to FIG. 6. Hereinafter, an example of estimating the wireless quality of a wireless section between the wireless LAN terminal 50A with an IP address of 192.168.11.3 and the AP 30 will be described.

First, when the monitoring apparatus 60 (the I/F 64) receives (captures) a packet transmitted and received in a wired section (S10), the processor 61 executes the packet classifying process 63a-1 and determines whether or not the higher protocol is the TCP by referring to a header of the received packet (S11).

As a result, when it is determined that the higher protocol is TCP (S11: NO), a return is made to S10. On the other hand, when it is determined that the higher protocol is TCP (S11: YES), the packet classifying process 63a-1 classifies packets determined as TCP for each wireless LAN terminal 50 (S12). For example, DATA packets transmitted by the server 20 are classified based on destination IP addresses. ACK packets received by the server 20 are classified based on transmission source IP addresses. In addition, for example, the classified packets are temporarily stored in a buffer (not illustrated) prepared for each wireless LAN terminal 50.

Next, the processor 61 executes the packet information storing process 63a-2 and determines whether or not a classified packet is a DATA packet (S13). In addition, when the packet information storing process 63a-2 determines that the classified packet is a DATA packet (S13: YES), the packet information storing process 63a-2 records a reception time point, a sequence number, a size (a TCP payload), and the like of the DATA packet in the basic information table T1 (S14) and a return is made to S10.

On the other hand, when the packet information storing process 63a-2 determines that the classified packet is not a DATA packet (S13: NO), the packet information storing process 63a-2 determine whether or not the classified packet is an ACK packet (S15). As a result, when it is determined that the classified packet is not an ACK packet (S15: NO), a return is made to S10.

On the other hand, when the packet information storing process 63a-2 determines that the classified packet is an ACK packet (S15: YES), the packet information storing process 63a-2 records a reception time point, an ACK number, and the like of the ACK packet in the basic information table T1 (S16).

Next, the packet information storing process 63a-2 refers to the basic information table T1 and detects the reception time point of the ACK packet determined in S15 and a reception time point of a DATA packet corresponding to the ACK packet, calculates an RTT based on the detected reception time point of the ACK packet and the detected reception time point of the DATA packet corresponding to the ACK packet, and records the RTT in the basic information table T1 (S17).

Next, the processor 61 executes the FA determining process 63a-3 and records the reception time point and the ACK number, the RTT calculated in S17, and the like of the ACK packet in the FA information table T3 (S18). In addition, the FA determining process 63a-3 sets the last ACK flag to 0 (S18).

Next, the FA determining process 63a-3 refers to the FA information table T2 to calculate a reception interval between the ACK packet determined in S15 and an immediately previous ACK packet, and determines whether or not the first condition where the calculated reception interval from the immediately previous ACK packet is smaller than a first reference value (for example, 10 µsec) and, at the same time, the second condition where the RTT has decreased are satisfied (S19).

As a result, when it is determined that the reception interval from the immediately previous ACK packet is larger than the first reference value or the RTT is increasing (S19: NO), since this means that the successive ACK packet group has been discontinued, the FA determining process 63a-3 changes the last ACK flag of the immediately previous ACK packet to 1 (S20).

Next, when the last ACK flag of the immediately previous ACK packet is 1, since this signifies a start of a new successive ACK packet group, the FA determining process 63a-3 sets the ACK Count to 1, but when the last ACK flag of the immediately previous ACK packet is 0, since one successive ACK packet group is ongoing, the FA determining process 63a-3 sets immediately previous ACK Count+1 to the FA information table T2 (ACK Count) (S21).

Next, the FA determining process 63a-3 determines whether or not a tabulation period (for example, 1 minute) has expired (S22). When the tabulation period has not expired (S22: NO), a return is made to S10.

Specific Examples of Processes of S18 to S22

When First ACK Packet Constituting One Successive ACK Packet Group is Received

First, processes of S18 to S22 when the ACK packet of No. 6609 illustrated in FIG. 8 is received as a first ACK packet constituting one successive ACK packet group will be described.

In S18, the FA determining process 63a-3 sets the reception time point=2017-03-07 10:57:50.313442, the ACK number=1102031479, the RTT=32708 µsec, the last ACK flag=0, and the like of the ACK packet of No. 6609 in the FA information table T2.

Since the reception interval (the difference in reception time points) between the ACK packet of No. 6609 and the immediately previous ACK packet (although not illustrated in FIG. 8, a packet of No. 6602) is 32619 µsec which is larger than the first reference value (for example, 10 µsec), NO is determined in S19 and the process advances to S20.

In S20, the FA determining process 63a-3 changes the last ACK flag of the immediately previous ACK packet (although not illustrated in FIG. 8, the packet of No. 6602) to 1.

In S21, since the last ACK flag of the immediately previous ACK packet (although not illustrated in FIG. 8, the packet of No. 6602) is 1, the FA determining process 63a-3 sets the ACK Count in the row of No. 6609 to 1.

In S22, since the tabulation period has not expired (S22: NO), a return is made to S10.

When Second or Subsequent ACK Packet Constituting One Successive ACK Packet Group is Received Next, processes of S18 to S22 when an ACK packet of No. 6610 illustrated in FIG. 8 is received as the second or subsequent ACK packet constituting one successive ACK packet group will be described.

In S18, the FA determining process 63a-3 sets the reception time point=2017-03-07 10:57:50.313444, the ACK number=1102034399, the RTT=32693 μsec, the last ACK flag=0, and the like of the ACK packet of No. 6610 in the FA information table T2.

Since the reception interval (the difference in reception time points) between the ACK packet of No. 6610 and the immediately previous ACK packet (the packet of No. 6609) is 2 μsec which is smaller than the first reference value (for example, 10 μsec) and, at the same time, RTT has decreased, YES is determined in S19 and the process advances to S21.

In S21, since the last ACK flag of the immediately previous ACK packet (the packet of No. 6609) is 0, the FA determining process 63a-3 sets the ACK Count to immediately previous ACK Count+1 (in this case, 2).

In S22, since the tabulation period has not expired (S22: NO), a return is made to S10.

Next, processes of S18 to S22 when an ACK packet of No. 6611 illustrated in FIG. 8 is received as the second or subsequent ACK packet constituting one successive ACK packet group will be described.

In S18, the FA determining process 63a-3 sets the reception time point=2017-03-07 10:57:50.313444, the ACK number=1102038211, the RTT=32673 μsec, the last ACK flag=0, and the like of the ACK packet of No. 6611 in the FA information table T2.

Since the reception interval (the difference in reception time points) between the ACK packet of No. 6611 and the immediately previous ACK packet (the packet of No. 6610) is 0 μsec which is smaller than the first reference value (for example, 10 μsec) and, at the same time, RTT has decreased, YES is determined in S19 and the process advances to S21.

In S21, since the last ACK flag of the immediately previous ACK packet (the packet of No. 6610) is 0, the FA determining process 63a-3 sets the ACK Count to immediately previous ACK Count+1 (in this case, 3).

In S22, since the tabulation period has not expired (S22: NO), a return is made to S10.

For example, when Nos. 6611.5, 6612, 6613, 6613.5, and 6614 illustrated in FIG. 8 are received as the second or subsequent ACK packet constituting one successive ACK packet group, the processes of S18 to S22 are executed in a similar manner to that described above.

When First ACK Packet Constituting Another Successive ACK Packet Group is Received Next, processes of S18 to S22 when an ACK packet of No. 6636 illustrated in FIG. 8 is received as a first ACK packet constituting another successive ACK packet group will be described.

In S18, the FA determining process 63a-3 sets the reception time point=2017-03-07 10:57:50.341480, the ACK number=1102057515, the RTT=18035 μsec, the last ACK flag=0, and the like of the ACK packet of No. 6636 in the FA information table T2.

Since the reception interval (the difference in reception time points) between the ACK packet of No. 6636 and the immediately previous ACK packet (a packet of No. 6614) is 34 μsec which is larger than the first reference value (for example, 10 μsec), NO is determined in S19 and the process advances to S20.

In S20, the FA determining process 63a-3 changes the last ACK flag of the immediately previous ACK packet (the packet of No. 6614) to 1.

In S21, since the last ACK flag of the immediately previous ACK packet (the packet of No. 6614) is 1, the FA determining process 63a-3 sets the ACK Count to 1.

In S22, since the tabulation period has not expired (S22: NO), a return is made to S10.

When Last ACK Packet in Tabulation Period is Received

Next, processes of S18 to S22 when an ACK packet of No. 6685 illustrated in FIG. 8 is received as a last ACK packet in the tabulation period will be described.

In S18, the FA determining process 63a-3 sets the reception time point=2017-03-07 10:57:50.388708, the ACK number=1102111047, the RTT=13632 μsec, and the last ACK flag=0 of the ACK packet of No. 6685 in the FA information table T2.

Since the reception interval (the difference in reception time points) between the ACK packet of No. 6685 and the immediately previous ACK packet (a packet of No. 6684) is smaller than the first reference value (for example, 10 μsec) and, at the same time, RTT has decreased, YES is determined in S19 and the process advances to S21.

In S21, since the last ACK flag of the immediately previous ACK packet (the packet of No. 6684) is 0, the FA determining process 63a-3 sets the ACK Count to immediately previous ACK Count+1 (in this case, 4).

Next, the FA determining process 63a-3 determines whether or not the tabulation period (for example, 1 minute) has expired (S22). When the tabulation period has not expired (S22: NO), a return is made to S10.

On the other hand, when the tabulation period has expired (S22: YES), the processor 61 executes the wireless quality analyzing process 63a-4, refers to the FA information table T2, and detects the number of successive ACK packet groups in the tabulation period (S23). For example, in the case of FIG. 8, the wireless quality analyzing process 63a-4 refers to the FA information table T2 and detects, as the number of successive ACK packet groups in the tabulation period, a total of five successive ACK packet groups including a successive ACK packet group 1 with ACK Count ranging from 1 to 8, a successive ACK packet group 2 with ACK Count ranging from 1 to 4, a successive ACK packet group 3 with ACK Count ranging from 1 to 5, a successive ACK packet group 4 with ACK Count ranging from 1 to 3, and a successive ACK packet group 5 with ACK Count ranging from 1 to 4.

Next, the wireless quality analyzing process 63a-4 refers to the FA information table T2 and detects the number of ACK packets constituting the successive ACK packet groups detected in S23 (S24). For example, in the case of FIG. 8, the wireless quality analyzing process 63a-4 refers to the FA information table T2 and detects eight, four, five, three, and four as the numbers of ACK packets constituting the successive ACK packet groups 1 to 5 detected in S23.

Next, the wireless quality analyzing process 63a-4 calculates a total number of ACK packets by adding up the numbers of ACK packets detected in S24 (S25). In the case of FIG. 8, 24 is calculated as the total number of ACK packets.

Next, the wireless quality analyzing process 63a-4 calculates an average number of ACK packets (an average FA aggregation number) by dividing the total number of ACK packets calculated in S25 by the number of successive ACK packet groups (in this case, 5) detected in S23 (S26). In the case of FIG. 8, 4.8 is calculated as the average number of ACK packets.

Next, the wireless quality analyzing process 63a-4 estimates wireless quality based on the average number of ACK packets calculated in S26, and outputs the wireless quality (S27).

For example, the wireless quality analyzing process 63a-4 uses a first threshold (for example, 4) and a second threshold (for example, 2) that is smaller than the first threshold, and estimates that the wireless quality is good when the average number of ACK packets exceeds the first threshold. The wireless quality analyzing process 63a-4 estimates that the wireless quality is normal when the average number of ACK packets is between the first threshold and the second threshold. The wireless quality analyzing process 63a-4 estimates that the wireless quality is bad when the average number of ACK packets does not exceed the second threshold. For example, when 4.8 is calculated as the average number of ACK packets, the wireless quality is estimated to be good. Alternatively, a maximum value or a median may be used in place of an average value.

While an example of estimating the wireless quality of the wireless section between the wireless LAN terminal 50A with an IP address of 192.168.11.3 and the AP 30 has been described above, the wireless quality of wireless sections between the other wireless LAN terminals 50B to 50E and the AP 30 can be estimated in a similar manner. Due to the packets being classified for each wireless LAN terminal 50 in S12, the processes of S13 to S27 are executed for each wireless LAN terminal 50. As a result, the basic information table T1 and the FA information table T2 are created for each wireless LAN terminal 50.

FIG. 9 is an output example of estimated wireless quality.

FIG. 9 represents an example in which the wireless quality estimated in S27 is output in association with a tabulation period, a wireless LAN terminal (for example, an IP address), and an FA aggregation number (an average number of ACK packets).

The tabulation period is a period such as 2017-03-07 10:57 during which information related to received packets (DATA packets and ACK packets) is recorded in the basic information table T1.

The wireless LAN terminal (for example, an IP address) is a destination IP address of a received DATA packet or a transmission source IP address of a received ACK packet.

The FA aggregation number (average number of ACK packets) is the average number of ACK packets calculated in S26.

For example, although not illustrated, the wireless quality estimated in S27 may be displayed on a display connected to the monitoring apparatus 60, printed by a printer, or recorded in a storage medium such as a hard disk or an SD card in association with a tabulation period, a wireless LAN terminal (for example, an IP address), and an FA aggregation number (an average number of ACK packets) as described above.

As described above, according to the present embodiment, since the monitoring apparatus 60 receives (captures) packets transmitted and received in a wired section, detects a successive ACK packet group, and estimates wireless quality of a wireless section based on the number of ACK packets constituting the detected successive ACK packet group, the wireless quality of a wireless section can be measured (estimated) with a simple method without having to capture packets in the wireless section or, in other words, without being based on wireless quality information as in conventional art.

Discerning wireless quality as described above enables various control to be carried out. For example, an AP to be connected, AP settings (channel, received signal strength, and transmission rate), and priority can be controlled.

In addition, according to the present embodiment, since two conditions including a first condition where reception intervals are smaller than a first reference value and a second condition where an RU of each ACK packet becomes shorter in the order of reception are adopted, the wireless quality of a wireless section can be estimated based on packets transmitted and received in a wired section which does not include wireless quality information instead of a wireless frame which includes wireless quality information.

Furthermore, according to the present embodiment, since the wireless quality of a wireless section can be measured by executing the packet analysis program 63a, the wireless quality of a wireless section can be measured without using expensive dedicated hardware. Moreover, the wireless quality of a wireless section can be measured without technical knowledge.

In addition, although acquiring information (such as wireless quality information) from a wireless LAN access point or a wireless LAN terminal conventionally took involving an agent, making a request to acquire information to an administrator, and the like, according to the present embodiment, since the wireless quality of a wireless section is measured by the monitoring apparatus 60 by receiving (capturing) a packet transmitted and received in a wired section, such trouble can be avoided.

Furthermore, although capturing a packet in a wireless section is conventionally labor and time intensive since visiting the site of the wireless section that is a measurement object is involved and packets are captured at a plurality of locations, according to the present embodiment, since the wireless quality of a wireless section is measured by connecting the monitoring apparatus 60 at the packet capture position p (refer to FIG. 1) near the server 20 in a wired section and having the monitoring apparatus 60 receive (capture) packets transmitted and received in the wired section, such labor and time need no longer be devoted.

Second Embodiment

In the first embodiment, two conditions including a first condition where reception intervals are smaller than a first reference value and a second condition where an RTT of each ACK packet becomes shorter in the order of reception are used as conditions for detecting a successive ACK packet group.

In the present embodiment, as a condition for detecting a successive ACK packet group, a third condition where a variation in an RTT of a last ACK packet in a plurality of successive ACK packet groups is smaller than a second reference value (for example, 100 ms) is further used.

The third condition where a variation in an RTT of a last ACK packet in a plurality of successive ACK packet groups is smaller than a second reference value will be described.

Figure 11B:
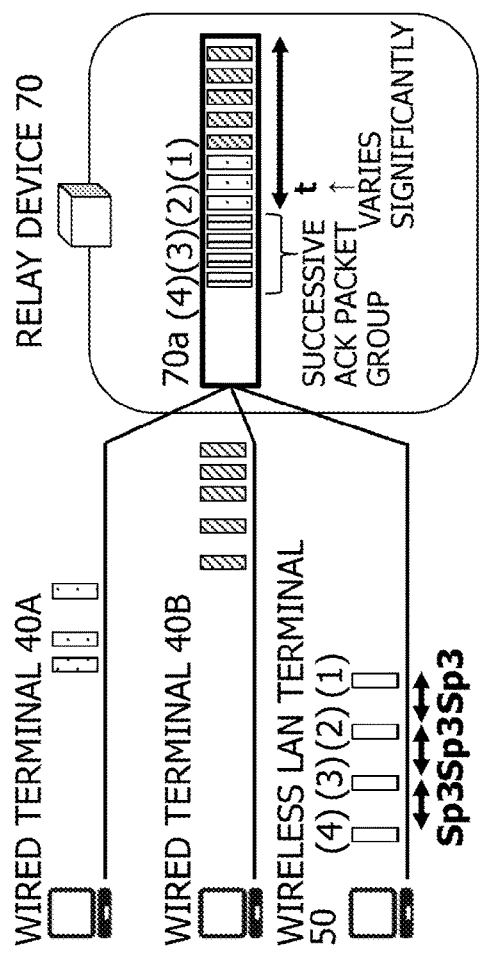
FIG. 11B represents packet intervals of the ACK packets (1) to (4) when queuing has occurred.
Figure 11A:
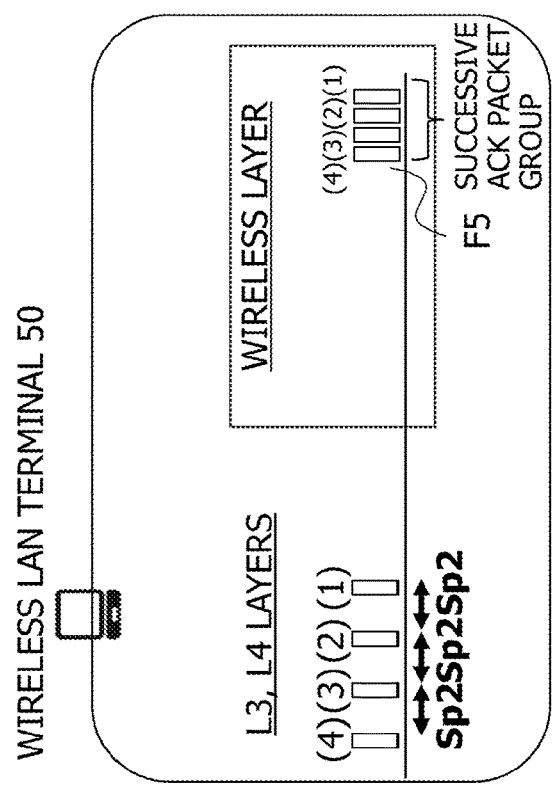
FIG. 11A represents packet intervals of ACK packets (1) to (4) when frame aggregation is executed.

FIG. 10A and FIG. 11A represent packet intervals of ACK packets (1) to (4) when frame aggregation is executed by the wireless LAN terminal 50, and FIG. 10B and FIG. 11B represent packet intervals of the ACK packets (1) to (4) when queuing has occurred in the relay device 70.

First, packet intervals of ACK packets when frame aggregation is executed by the wireless LAN terminal 50 will be described.

As illustrated in FIG. 10A, for example, when the wireless LAN terminal 50 receives a plurality of DATA packets (1) to (4) transmitted by the server 20 and addressed to the wireless LAN terminal 50, the wireless LAN terminal 50 executes frame aggregation and aggregates a plurality of ACK packets (1) to (4) corresponding to the plurality of DATA packets (1) to (4), and wirelessly transmits the aggregated ACK packets in a single wireless frame F5. In this case, for example, in layers 3 and 4, the plurality of ACK packets (1) to (4) at packet intervals Sp2 are aggregated in a wireless layer by frame aggregation into the single wireless frame F5 as illustrated in FIG. 11A. Accordingly, the ACK packets (1) to (4) are delivered to the server 20 as a group of ACK packets (in other words, a successive ACK packet group) with narrowed packet intervals between the ACK packets (1) to (4). As a result, reception intervals of the plurality of ACK packets (1) to (4) at the monitoring apparatus 60 become narrower and, further, RTTs become sequentially shorter.

Next, packet intervals of ACK packets when queuing has occurred in the relay device 70 will be described.

As illustrated in FIG. 10B, when the wireless LAN terminal 50 receives a plurality of DATA packets (1) to (4) transmitted by the server 20 and addressed to the wireless LAN terminal 50, the wireless LAN terminal 50 does not execute frame aggregation and respectively wirelessly transmits a plurality of ACK packets (1) to (4) corresponding to the plurality of DATA packets (1) to (4) in separate wireless frames F1 to F4. In this case, as illustrated in FIG. 11B, for example, when the plurality of ACK packets (1) to (4) at packet intervals Sp3 are queued in an order in which the ACK packets arrive to a queue 70a included in the relay device 70, a wait time t until a packet from the wired terminal 40 having been queued earlier is transmitted from the queue 70a occurs before the queued plurality of ACK packets (1) to (4) are transmitted from the queue 70a.

Therefore, the plurality of ACK packets (1) to (4) are delivered to the server 20 as a group of ACK packets (in other words, a successive ACK packet group) with narrowed packet intervals between the ACK packets (1) to (4). As a result, reception intervals of the plurality of ACK packets (1) to (4) at the monitoring apparatus 60 become narrower and, further, RTTs become sequentially shorter.

In this manner, when queuing occurs, packet intervals of the plurality of ACK packets (1) to (4) become narrower and, further, RTTs become sequentially shorter in a similar manner to when frame aggregation occurs. Therefore, there is a problem in that two conditions including a first condition where reception intervals are smaller than a first reference value and a second condition where an RTT of each ACK packet becomes shorter in the order of reception are insufficient to distinguish an occurrence of queuing and an occurrence of frame aggregation from each other.

In consideration thereof, attention is focused on an RTT of a last ACK packet of a successive ACK packet group.

When queuing occurs, since the wait time t varies in accordance with an amount of queued packets from the wired terminal 40 as illustrated in FIG. 11B, the RTT (4) of the last ACK packet (4) in the successive ACK packet group due to queuing varies significantly as illustrated in FIG. 10B. In contrast, when queuing does not occur but frame aggregation occurs, as illustrated in FIG. 10A, the RTT (4) of the last ACK packet (4) in the successive ACK packet group due to frame aggregation hardly varies.

In consideration thereof, in the present embodiment, as a condition for detecting a successive ACK packet group attributable to frame aggregation while distinguishing a successive ACK packet group attributable to frame aggregation from a successive ACK packet group attributable to queuing, a third condition where a variation in an RTT of a last ACK packet in a successive ACK packet group is smaller than a second reference value is further adopted. As the second reference value, a time (for example, 100 msec) which enables a successive ACK packet group attributable to frame aggregation and a successive ACK packet group attributable to queuing to be distinguished from each other is selected. Due to this condition, a successive ACK packet group attributable to queuing can be eliminated from estimation objects of wireless quality and, at the same time, a successive ACK packet group attributable to frame aggregation can be set as an estimation object of wireless quality. As a result, estimation accuracy of wireless quality can be enhanced.

Figure 12:
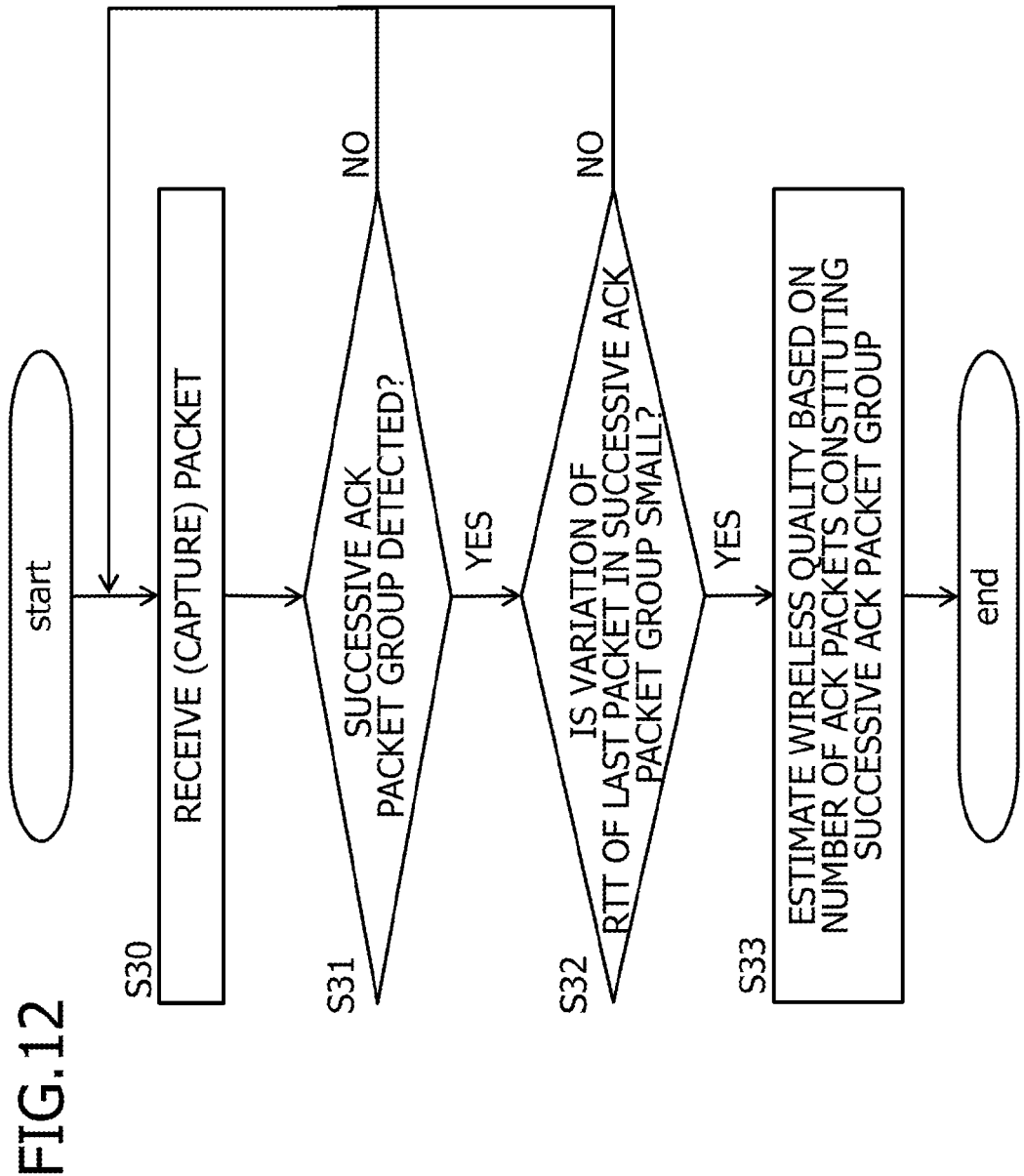
FIG. 12 is a flow chart of a wireless quality estimating process (summary) executed by the monitoring apparatus 60.
Figure 13:
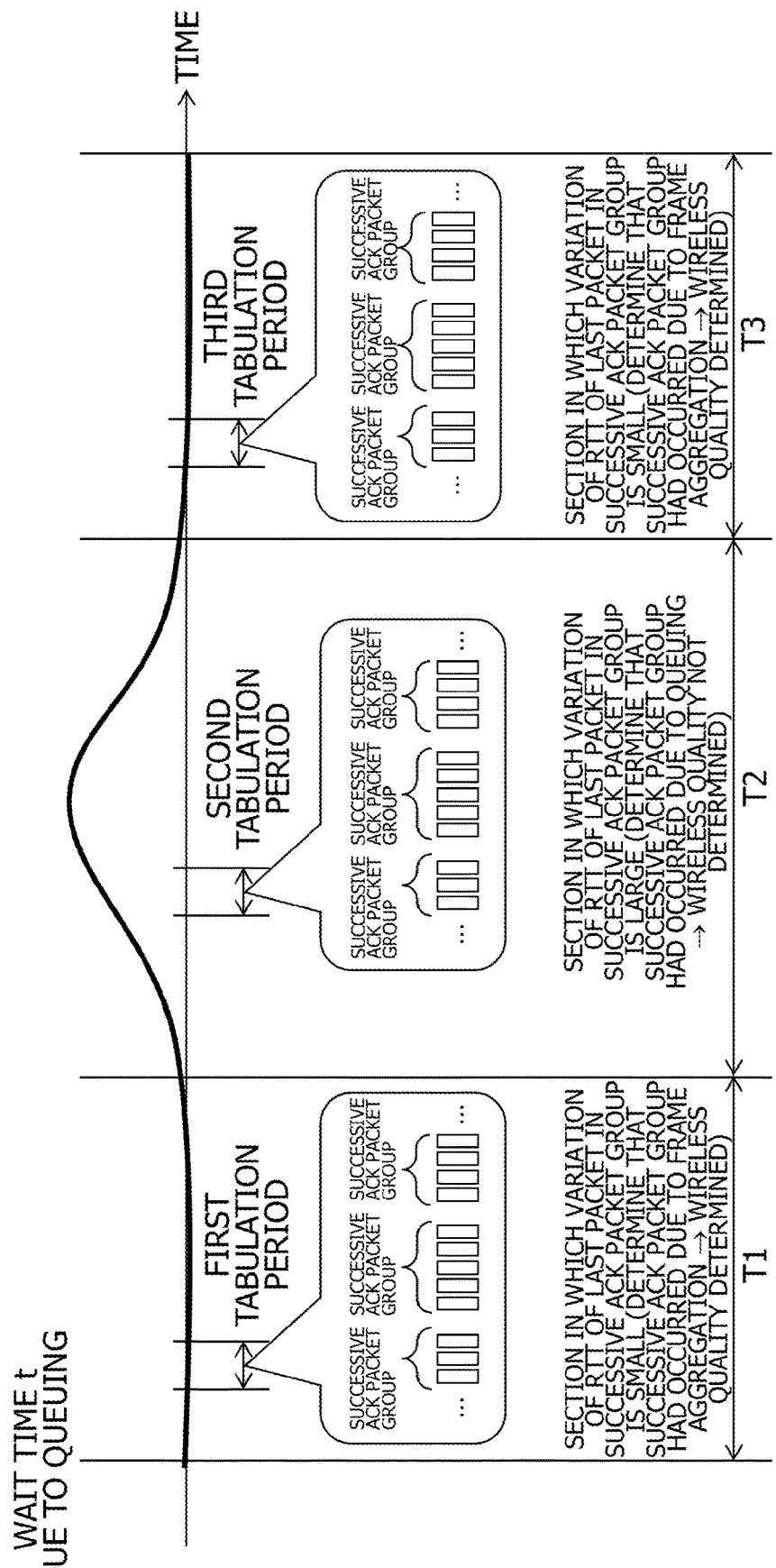
FIG. 13 is a diagram for explaining a period for estimating wireless quality.

FIG. 12 is a flow chart of a wireless quality estimating process (summary) executed by the monitoring apparatus 60. The flow chart illustrated in FIG. 12 corresponds to an addition of a process of S32 to the flow chart illustrated in FIG. 3. FIG. 13 is a diagram for explaining a period for estimating wireless quality.

When the processor 61 executes the packet analysis program 63a deployed on the main memory 62, the monitoring apparatus 60 executes: a process of receiving (capturing) packets transmitted and received in the wired section such as a DATA packet transmitted by the server 20 and addressed to the wireless LAN terminal 50 and an ACK packet transmitted by the wireless LAN terminal 50 and addressed to the server 20 (S30); a process of detecting, from the received packets, a group of ACK packets (in other words, a successive ACK packet group) of which packet intervals have been narrowed (S31); when a successive ACK packet group is detected (S31: YES), a process of determining whether or not a variation in an RTT of a last ACK packet in the successive ACK packet group is smaller than the second reference value (third condition) (S32); and when it is determined that the variation in the RTT of the last ACK packet in the successive ACK packet group is smaller than the second reference value (S32: YES), a process of estimating the wireless quality of the wireless section based on the number of ACK packets constituting the successive ACK packet group detected in S31 (S33).

In other words, as illustrated in FIG. 13, in a tabulation period (for example, a first tabulation period in a period T1 and a third tabulation period in a period T3 in FIG. 13) in which a variation in the wait time t due to queuing is small, the variation in the RTT of the last ACK packet in the successive ACK packet group is smaller than the second reference value.

In this case, since it is conceivable that the successive ACK packet group detected in S31 has occurred due to frame aggregation, the process of estimating the wireless quality of a wireless section (S33) is executed.

On the other hand, as illustrated in FIG. 13, in a tabulation period (for example, a second tabulation period in a period T2 in FIG. 13) in which a variation in the wait time t due to queuing is large, the variation in the RTT of the last ACK packet in the successive ACK packet group is larger than the second reference value.

In this case, since it is conceivable that the successive ACK packet group detected in S31 has occurred due to queuing, a return is made to S30 without executing the process of estimating the wireless quality of a wireless section (S33).

Figure 14:
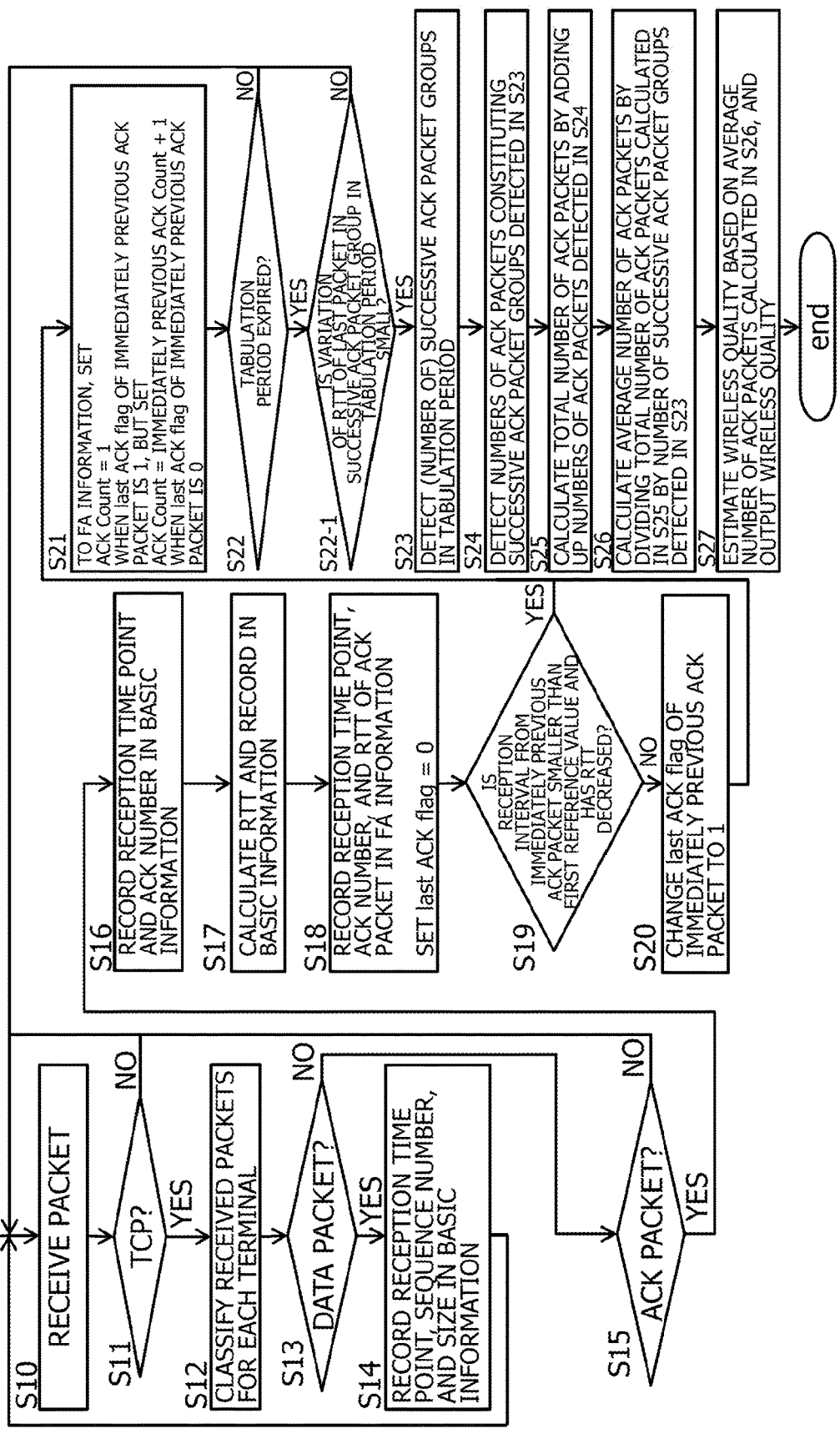
FIG. 14 is a flow chart of a wireless quality estimating process (detailed) executed by the monitoring apparatus 60.

FIG. 14 is a flow chart of a wireless quality estimating process (detailed) executed by the monitoring apparatus 60.

The flow chart illustrated in FIG. 14 corresponds to an addition of a process of S22-1 to the flow chart illustrated in FIG. 6.

Processes of S10 to S22 and S23 to S27 are similar to those in FIG. 6.

When the tabulation period has expired (S22: YES), processes of S22-1 and thereafter are executed.

Specifically, when the tabulation period has expired (S22: YES), the FA determining process 63a-3 determines whether or not a variation in an RTT of a last ACK packet in a successive ACK packet group in the tabulation period is smaller than a second reference value (third condition) (S22-1).

For example, whether or not the variation in the RTT of the last ACK packet in a successive ACK packet group in the tabulation period is smaller than a second reference value is determined as follows.

In the case of FIG. 8, since the RTTs of the last ACK packets of the successive ACK packet groups 1 to 5 in the tabulation period are 32429 μsec (the packet of No. 6614), 17871 μsec (a packet of No. 6639), 17809 μsec (a packet of No. 6658), 14308 μsec (a packet of No. 6674), and 13632 μsec (a packet of No. 6685) and a difference between a maximum value and a minimum value is 32429−13632=18797 μsec, the variation in the RTTs of the last ACK packets is determined to be smaller than the second reference value (for example, 100 ms). In other words, the successive ACK packet groups 1 to 5 in the tabulation period (the FA determination period) are determined to be successive ACK packet groups due to frame aggregation. Alternatively, a standard deviation, a variance value, or the like may be used in place of the difference between a maximum value and a minimum value. For example, when a standard deviation of the RTTs is smaller than a reference value (for example, 50 ms), a determination may be made that the variation is small and, therefore, the successive ACK packet groups 1 to 5 in the tabulation period (an FA determination period) are successive ACK packet groups due to frame aggregation, but when the standard deviation of the RTTs is equal to or larger than the reference value (for example, 50 ms), a determination may be made that the variation is large and, therefore, the successive ACK packet groups 1 to 5 in the tabulation period (the FA determination period) are not successive ACK packet groups due to frame aggregation. For example, in the case of FIG. 8, the RTTs are 32429, 17871, 17809, 14308, and 13632, and a standard deviation thereof is 7,642=7 ms. In this case, since the standard deviation is smaller than the reference value (for example, 50 ms), it is determined that the variation is small and, therefore, the successive ACK packet groups 1 to 5 in the tabulation period (the FA determination period) are successive ACK packet groups due to frame aggregation. In addition, although not illustrated, when the RTTs are 32429, 5417871, 7809, 214308, and 1013632, a standard deviation thereof is 2,317,712=2 seconds. In this case, since the standard deviation is larger than the reference value (for example, 50 ms), it is determined that the variation is large and, therefore, the successive ACK packet groups 1 to 5 in the tabulation period (the FA determination period) are not successive ACK packet groups due to frame aggregation.

Subsequently, processes of S23 to S27 are executed in a similar manner to the first embodiment. The processes of S23 to S27 are similar to those in FIG. 6.

As described above, according to the present embodiment, the following effects can be produced in addition to the effects produced by the first embodiment.

That is, since a third condition where a variation in an RU of a last ACK packet in a successive ACK packet group is smaller than a second reference value is adopted, a successive ACK packet group attributable to queuing can be eliminated from estimation objects of wireless quality and, at the same time, a successive ACK packet group attributable to frame aggregation can be set as an estimation object of wireless quality. Therefore, estimation accuracy of wireless quality can be enhanced.

In addition, according to the present embodiment, when it is determined that the variation in the RTT of the last ACK packet in a successive ACK packet group is smaller than the second reference value (S22-1: YES) or, in other words, when it is determined that the successive ACK packet group has occurred due to frame aggregation, a terminal type of a transmission source terminal of the successive ACK packet group can be determined to be a wirelessly-connected terminal.

Third Embodiment

Next, a process of determining a quality-deteriorated location will be described as a third embodiment.

Figure 15:
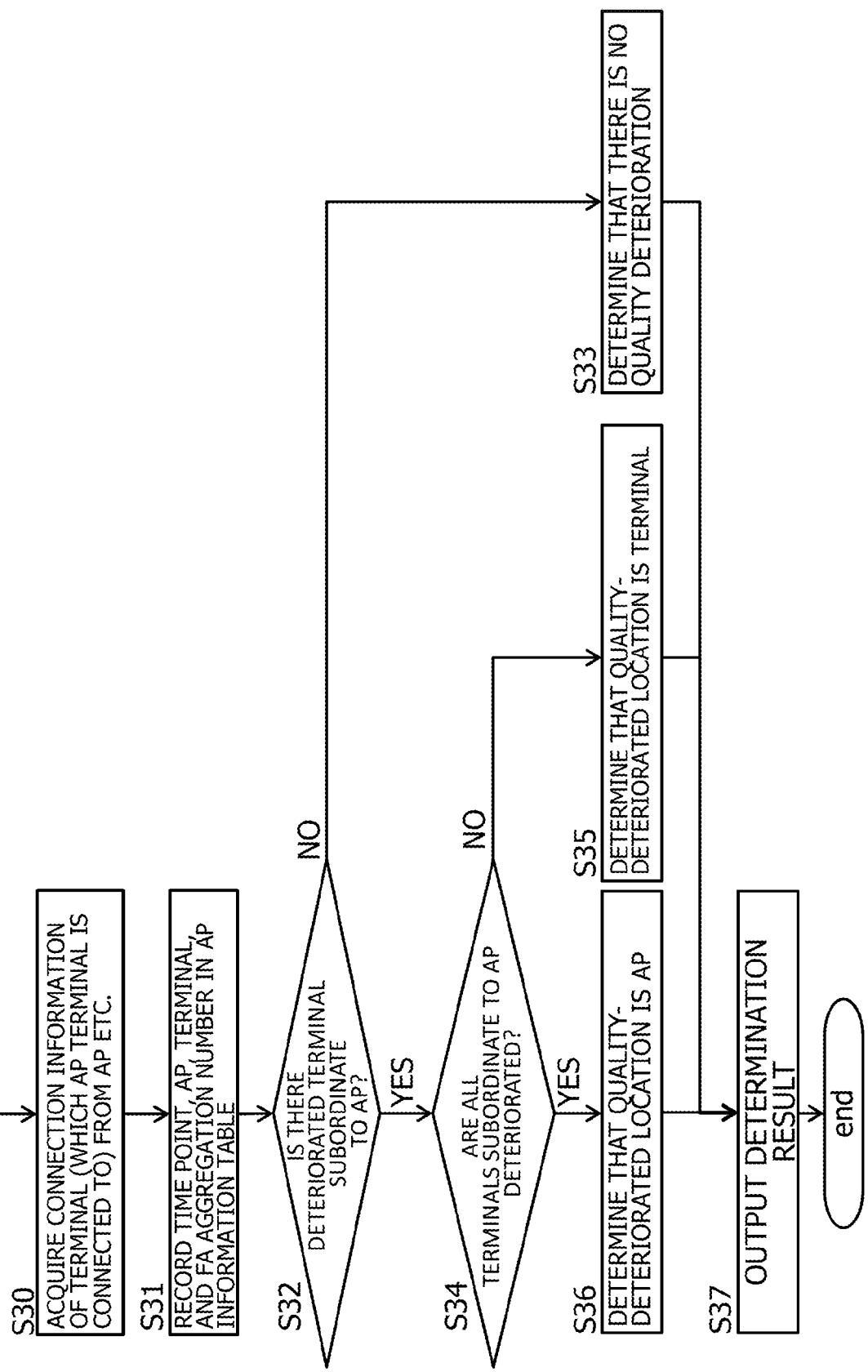
FIG. 15 is a flow chart for explaining a process of determining a quality-deteriorated location.

FIG. 15 is a flow chart for explaining a process of determining a quality-deteriorated location.

The following process is realized when the processor 61 of the monitoring apparatus 60 executes the packet analysis program 63a.

First, by executing the quality-deteriorated location determining process 63a-5 (refer to FIG. 5), the processor 61 accesses the AP 30 and acquires wireless LAN terminal connection information 31 (refer to FIG. 1) from the AP 30 (or a wireless LAN controller (not illustrated)) (S30).

FIG. 16A is an example of the wireless LAN terminal connection information 31 stored in a memory of the AP 30. The wireless LAN terminal connection information 31 includes TIME, AP, and wireless LAN terminal as items.

The TIME item records, for example, a time at which identification information (an IP address) of the wireless LAN terminal 50 connected to the AP 30 identified by the AP item is detected and recorded in the wireless LAN terminal item. Identification information of the AP 30 is recorded in the AP item. The wireless LAN terminal item records identification information (an IP address) of the wireless LAN terminal 50 connected to the AP 30 identified by the AP item at a time point of the time recorded in the TIME item. Note that, hereinafter, the wireless LAN terminal 50 connected to the AP 30 may be referred to as the wireless LAN terminal 50 subordinate to the AP 30. FIG. 16A is an example of the wireless LAN terminal connection information 31 in which is recorded the wireless LAN terminal 50 subordinate to the AP 30 at same intervals as the tabulation period or, in other words, at 1-minute intervals.

Next, the quality-deteriorated location determining process 63a-5 records the wireless LAN terminal connection information 31 acquired from the AP 30 or, in other words, a time, identification information of the AP 30, identification information of the wireless LAN terminal 50, and the FA aggregation number (the average number of ACK packets) calculated in S26 in the AP information table T3 stored in the storage 63 of the monitoring apparatus 60 (S31).

FIG. 16B is an example of the AP information table T3 stored in the storage 63 of the monitoring apparatus 60. The AP information table T3 includes TIME, AP, wireless LAN terminal, and FA aggregation number as items.

The time recorded in the TIME item in the wireless LAN terminal connection information 31 acquired from the AP 30 is recorded in the TIME item.

The identification information of the AP 30 recorded in the AP item in the wireless LAN terminal connection information 31 acquired from the AP 30 is recorded in the AP item.

The identification information (the IP address) of the wireless LAN terminal 50 recorded in the wireless LAN terminal item in the wireless LAN terminal connection information 31 acquired from the AP 30 is recorded in the wireless LAN terminal item.

The average number of ACK packets calculated in S26 is recorded in the FA aggregation number item.

In this manner, in the AP information table T3, the identification information of the AP 30, the identification information (for example, the IP address) of the wireless LAN terminal 50 subordinate to the AP 30, and the average number of ACK packets (the average FA aggregation number) calculated in S26 are recorded in association with each other.

Returning now to FIG. 15, next, the quality-deteriorated location determining process 63a-5 determines whether or not there is a deteriorated wireless LAN terminal 50 subordinate to the AP 30 (S32).

Whether or not there is a deteriorated wireless LAN terminal 50 subordinate to the AP 30 can be determined based on, for example, a presence or absence of a wireless LAN terminal 50 of which the FA aggregation number is below a threshold (for example, 2) when referring to the AP information table T3.

For example, when there is no wireless LAN terminal 50 of which the FA aggregation number is below the threshold, the quality-deteriorated location determining process 63a-5 determines that there is no deteriorated wireless LAN terminal 50 subordinate to the AP 30 (S32: NO), and determines that there is no quality deterioration (S33).

On the other hand, when there is a wireless LAN terminal 50 of which the FA aggregation number is below the threshold (for example, 2), the quality-deteriorated location determining process 63a-5 determines that there is a deteriorated wireless LAN terminal 50 subordinate to the AP 30 (S32: YES), and determines whether or not all wireless LAN terminals 50 subordinate to the AP 30 are deteriorated (S34).

As a result, when not all wireless LAN terminals 50 subordinate to the AP 30 are deteriorated (S34: NO) or, in other words, when the FA aggregation number is below the threshold with respect to only a part of the wireless LAN terminals 50, the quality-deteriorated location determining process 63a-5 determines that the part of the wireless LAN terminals 50 are quality-deteriorated locations (S35).

On the other hand, as a result of the determination in S34, when all wireless LAN terminals 50 subordinate to the AP 30 are deteriorated (S34: YES) or, in other words, when the FA aggregation number is below the threshold for all of the wireless LAN terminals 50, the quality-deteriorated location determining process 63a-5 determines that the AP 30 is a quality-deteriorated location (S35).

Next, the quality-deteriorated location determining process 63a-5 outputs a determination result (S36).

FIGS. 17A and 17B and FIGS. 18A and 18B are output examples of the determination result.

FIG. 17A is an example in which determination results (quality-deteriorated locations) of S33, S35, and S36 are output in association with TIME, AP, wireless LAN terminal, and FA aggregation number.

FIG. 17B is an example in which determination results (quality-deteriorated locations) of S33, S35, and S36 are output in association with TIME, AP, wireless LAN terminal, FA aggregation number (an average number of ACK packets), an average FA aggregation number value, and AP quality. The average FA aggregation number value is an average value obtained for each AP 30 by totaling and averaging the FA aggregation numbers (average numbers of ACK packets) of the wireless LAN terminals 50 subordinate to the AP 30.

The AP quality can be determined as follows. For example, a first threshold (for example, 4) and a second threshold (for example, 2) that is smaller than the first threshold are used. For each AP 30, an average FA aggregation number value is calculated by averaging the FA aggregation numbers (average numbers of ACK packets) of the wireless LAN terminals 50 subordinate to the AP 30, and when the average FA aggregation number value exceeds the first threshold, the AP quality is determined to be good, when the average FA aggregation number value is between the first threshold and the second threshold, the AP quality is determined to be normal, and when the average FA aggregation number value does not exceed the second threshold, the AP quality is determined to be bad.

In addition, as illustrated in FIGS. 18A and 18B, the determination results of S33, S35, and S36 may be output in a format including images I1, I2, and I3 respectively representing the AP 30, the wireless LAN terminal 50, and a wireless communication path between the two, an image I4 representing wireless quality, and an image I5 representing a quality-deteriorated location.

Furthermore, although not illustrated, the determination results of S33, S35, and S36 may be displayed on a display connected to the monitoring apparatus 60, printed by a printer, or recorded in a storage medium such as a hard disk or an SD card.

As described above, according to the present embodiment, a quality-deteriorated location (the AP 30 or the wireless LAN terminal 50) can be determined (estimated) based on the AP information table T3 which associates the identification information of the AP 30, the identification information (for example, the IP address) of the wireless LAN terminal 50 subordinate to the AP 30, and the average number of ACK packets (the average FA aggregation number) calculated in S26 with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a packet analysis program for causing a computer to execute a process comprising:

receiving, in a network system including a wireless terminal, a wireless network section in which the wireless terminal is located, a wired network section, and a first communication terminal which exchange packets with the wireless terminal, a plurality of DATA packets transmitted from the first communication terminal to the wireless terminal and a plurality of ACK packets responded from the wireless terminal to the first communication terminal in response to the plurality of DATA packets at a packet capture position in the wired network section, the wireless terminal, upon receiving the plurality of DATA packets, aggregating the plurality of ACK packets and wirelessly transmitting aggregated plurality of ACK packets in a single frame to the wireless network section;

calculating a round-trip time of each of a plurality of received ACK packets received at the packet capture position based on reception time points of the plurality of received ACK packets and reception time points of a plurality of received DATA packets received at the packet capture position;

detecting, from the plurality of received ACK packets, a successive ACK packet group including a plurality of received ACK packets for which each reception interval is smaller than a first reference value and in which the round-trip time of each of the plurality of received ACK packets becomes shorter in order of reception; and estimating wireless quality based on the number of the plurality of received ACK packets constituting the successive ACK packet group.

2. The non-transitory computer-readable storage medium according to claim 1, wherein the detecting process includes detecting a plurality of the successive ACK packet groups, and the estimating process is executed when a variation in the round-trip times of last ACK packets in the plurality of detected successive ACK packet groups is smaller than a second reference value.

3. The non-transitory computer-readable storage medium according to claim 2, wherein the process further includes a process of classifying, for each terminal, the plurality of received ACK packets, and the detecting process and the estimating process are executed for each classified terminal.

4. The non-transitory computer-readable storage medium according to claim 2, wherein the network system further includes: an access point which is provided between the wired network section and the wireless network section and which relays the plurality of DATA packets and the plurality of ACK packets between the wired network section and the wireless network section; and a relay device which is connected between the access point and the packet capture position in the wired network section and which includes a queue in which arrived packets are queued in order of arrival.

5. The non-transitory computer-readable storage medium according to claim 1, wherein the process further includes a process of classifying, for each terminal, the plurality of received ACK packets, and the detecting process and the estimating process are executed for each classified terminal.

6. The non-transitory computer-readable storage medium according to claim 1, wherein the detecting process includes detecting a plurality of the successive ACK packet groups, the process further includes a process of calculating an average number of ACK packets of each successive ACK packet group by dividing a sum of the numbers of ACK packets constituting the plurality of successive ACK packet groups by the number of the successive ACK packet groups, and the estimating process includes estimating wireless quality based on the calculated average number of ACK packets.

7. The non-transitory computer-readable storage medium according to claim 1, wherein the process further includes a process of determining a quality-deteriorated location based on the estimated wireless quality and identification information of a wireless terminal connected to an access point.

8. The non-transitory computer-readable storage medium according to claim 1, wherein the process further includes a process of outputting the estimated wireless quality.

9. A packet analyzing apparatus comprising:

a processor; and a memory accessed by the processor, the processor executes a process comprising:

receiving, in a network system including a wireless terminal, a wireless network section in which the wireless terminal is located, a wired network section, and a first communication terminal which exchange packets with the wireless terminal, a plurality of DATA packets transmitted from the first communication terminal to the wireless terminal and a plurality of ACK packets responded from the wireless terminal to the first communication terminal in response to the plurality of DATA packets at a packet capture position in the wired network section, the wireless terminal, upon receiving the plurality of DATA packets, aggregating the plurality of ACK packets and wirelessly transmitting aggregated plurality of ACK packets in a single frame to the wireless network section;

calculating a round-trip time of each of a plurality of received ACK packets received at the packet capture position based on reception time points of the plurality of received ACK packets and reception time points of a plurality of received DATA packets received at the packet capture position;

detecting, from the plurality of received ACK packets, a successive ACK packet group including a plurality of received ACK packets for which each reception interval is smaller than a first reference value and in which the round-trip time of each of the plurality of received ACK packets becomes shorter in order of reception; and estimating wireless quality based on the number of the plurality of received ACK packets constituting the successive ACK packet group.

10. A packet analysis method, wherein the method causes a computer to execute a process comprising:

receiving, in a network system including a wireless terminal, a wireless network section in which the wireless terminal is located, a wired network section, and a first communication terminal which exchange packets with the wireless terminal, a plurality of DATA packets transmitted from the first communication terminal to the wireless terminal and a plurality of ACK packets responded from the wireless terminal to the first communication terminal in response to the plurality of DATA packets at a packet capture position in the wired network section, the wireless terminal, upon receiving the plurality of DATA packets, aggregating the plurality of ACK packets and wirelessly transmitting aggregated plurality of ACK packets in a single frame to the wireless network section;

calculating a round-trip time of each of a plurality of received ACK packets received at the packet capture position based on reception time points of the plurality of received ACK packets and reception time points of a plurality of received DATA packets received at the packet capture position;

detecting, from the plurality of received ACK packets, a successive ACK packet group including a plurality of received ACK packets for which each reception interval is smaller than a first reference value and in which the round-trip time of each of the plurality of received ACK packets becomes shorter in order of reception; and estimating wireless quality based on the number of the plurality of received ACK packets constituting the successive ACK packet group.

\* \* \* \* \*